United States Patent
Takahashi et al.

(10) Patent No.: US 11,016,533 B1
(45) Date of Patent: May 25, 2021

(54) TABLET PC CASE AND ELECTRONIC APPARATUS

(71) Applicant: LENOVO (SINGAPORE) PTE. LTD., Singapore (SG)

(72) Inventors: Shinnosuke Takahashi, Yokohama (JP); Kako Nemoto, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/850,115

(22) Filed: Apr. 16, 2020

(30) Foreign Application Priority Data

Dec. 9, 2019 (JP) .............................. JP2019222322

(51) Int. Cl.
*G06F 1/16* (2006.01)
*G06F 3/02* (2006.01)

(52) U.S. Cl.
CPC .......... *G06F 1/1628* (2013.01); *G06F 1/1626* (2013.01); *G06F 1/1632* (2013.01); *G06F 3/0202* (2013.01); *G06F 2200/1633* (2013.01)

(58) Field of Classification Search
CPC .... G06F 1/1628; G06F 1/1626; G06F 1/1632; G06F 2200/1633; G06F 3/0202
See application file for complete search history.

(56) References Cited

U.S. PATENT DOCUMENTS

| | | | | |
|---|---|---|---|---|
| D636,778 S | * | 4/2011 | Corsini | D14/434 |
| 8,208,245 B2 | * | 6/2012 | Staats | G06F 1/1656 361/679.02 |
| 8,230,992 B2 | * | 7/2012 | Law | G06F 1/1626 206/320 |
| 8,282,060 B2 | * | 10/2012 | Fan | F16M 11/041 248/291.1 |
| D682,281 S | * | 5/2013 | Barnard | D14/447 |
| 8,467,178 B2 | * | 6/2013 | Probst | G06F 1/1632 361/679.27 |
| 8,573,394 B2 | * | 11/2013 | Ahee | G06F 1/1662 206/320 |
| 8,611,086 B1 | * | 12/2013 | Magnusson | G06F 1/1656 361/679.59 |
| 8,749,963 B2 | * | 6/2014 | Staats | G06F 1/1616 361/679.26 |

(Continued)

FOREIGN PATENT DOCUMENTS

JP 2006024178 A 1/2006

*Primary Examiner* — Adrian S Wilson
(74) *Attorney, Agent, or Firm* — Shimokaji IP

(57) ABSTRACT

A tablet PC case includes a first protective cover, a second protective cover, and a connection unit. The first protective cover includes a pair of retained frame portions. Each retained frame portion includes an outer surface portion and a first end face. The second protective cover includes a chassis, an input unit, a terminal group, and a magnet portion. The chassis includes a groove portion recessed from the front surface of the chassis. The groove portion includes a first groove in which one edge of the tablet PC can be retained, and a pair of second grooves in which the pair of retained frame portions is retained. The second groove includes a groove base surface like a curved concave surface in contact with the outer surface portion, and a second end face opposed to the first end face. The terminal group is disposed in the first groove.

11 Claims, 23 Drawing Sheets

(56) References Cited

U.S. PATENT DOCUMENTS

| | | | | |
|---|---|---|---|---|
| 8,837,131 B1* | 9/2014 | Colby | ............ | G06F 1/1628 |
| | | | | 361/679.06 |
| 8,913,380 B2* | 12/2014 | Enomoto | ............ | G06F 1/1632 |
| | | | | 361/679.41 |
| 9,013,863 B2* | 4/2015 | Hsu | ............ | G06F 1/1654 |
| | | | | 361/679.01 |
| 9,274,556 B2* | 3/2016 | Gallouzi | ............ | F16M 11/105 |
| 2003/0222848 A1* | 12/2003 | Solomon | ............ | G06F 1/1626 |
| | | | | 345/156 |
| 2003/0227746 A1* | 12/2003 | Sato | ............ | G06F 1/1626 |
| | | | | 361/679.57 |
| 2006/0221565 A1* | 10/2006 | Doherty | ............ | G06F 1/1632 |
| | | | | 361/679.41 |
| 2010/0172081 A1* | 7/2010 | Tian | ............ | G06F 1/1632 |
| | | | | 361/679.29 |
| 2012/0068832 A1* | 3/2012 | Feldstein | ............ | G06F 1/1626 |
| | | | | 340/12.5 |
| 2012/0189156 A1* | 7/2012 | Leung | ............ | G06F 1/1632 |
| | | | | 381/387 |
| 2012/0307448 A1* | 12/2012 | Allen | ............ | E05B 73/0082 |
| | | | | 361/679.57 |
| 2013/0058023 A1* | 3/2013 | Supran | ............ | G06F 1/1632 |
| | | | | 361/679.01 |
| 2014/0118930 A1* | 5/2014 | Sedon | ............ | G06F 1/1632 |
| | | | | 361/679.56 |

\* cited by examiner

TABLET PC CASE AND ELECTRONIC APPARATUS

FIELD OF INVENTION

The present invention relates to a tablet PC case and an electronic apparatus.

BACKGROUND OF THE INVENTION

Conventionally, for example, Japanese Unexamined Patent Application Publication No. 2006-24178 discloses a foldable computer cover. The foldable computer cover can place a tablet personal computer (PC) in a standing state by having a lower edge of the tablet PC retained on a retaining block of a third plate where an input device, such as a keyboard or the like, is provided.

SUMMARY OF THE INVENTION

There is a demand for use of this type of electronic apparatuses at school or the like for an educational purpose. In using such electronic apparatuses for an educational purpose, the tablet PC may be covered with, for example, elastomeric protective covers to prevent damage to the tablet PCs.

In the case where a tablet PC is covered with a protective cover, however, the retaining state of the input device, such as a keyboard or the like, relative to the chassis surface is unstable when the tablet PC is placed in a standing state, and the standing posture of the tablet PC as well can be unstable. Also, a wired electrical connection between a tablet PC covered with a protective cover and an input device cannot be readily established while keeping a good appearance. Although wireless electrical connection by means of Bluetooth (registered trademark), for example, can be readily established between a tablet PC and an input device, the connection can be crossed among users in use of such electronic apparatuses for an educational purpose with a plurality of users present in the same area. Further, various kinds of sensors or the like to determine whether the mode of the electronic apparatus is in a state in which an input device is used or a state in which an input device is not used are necessary in order to prevent unintended erroneous input, which complicates the structure.

In view of the above-described situation, one object of the present invention is to provide a tablet PC case and an electronic apparatus that can prevent damage to a tablet PC and stably maintain the posture of the tablet PC in a standing state, and allows ready establishment of wired electrical connection between the tablet PC and an input device while keeping a good appearance.

A tablet PC case according to one aspect of the present invention includes a first protective cover having an opening in which a display surface of a tablet PC is exposed, the first protective cover being capable of housing the tablet PC therein; a second protective cover configured to cover the opening of the first protective cover so as to open or close the opening; and a connection unit connecting the first protective cover and the second protective cover in a relatively movable manner, the connection unit being capable of holding the first protective cover in a standing state in which the first protective cover stands on the second protective cover, wherein the first protective cover includes a frame body covering the outer circumferential portion of the tablet PC, the frame body being capable of holding the tablet PC, the frame body includes a pair of retained frame portions extending along one edge of the outer circumferential portion of the tablet PC, the one edge being opposed to the second protective cover in the standing state, the pair of retained frame portions being disposed at an interval in the extending direction in which the one edge extends, the retained frame portion includes an outer surface portion like a curved convex surface, extending in the extending direction, and a first end face positioned on the inside end portion of the retained frame portion in the extending direction, the first end face being directed inward in the extending direction, the second protective cover includes a chassis having a plate external shape, an input unit held in the chassis, the input unit being formed on the inner surface of the second protective cover, a terminal group exposed on the inner surface of the second protective cover in a position closer to the connection unit than the input unit, the terminal group being electrically connectable to the lateral surface of the tablet PC in the standing state, and a magnet portion disposed inside the chassis, the magnet being capable of attracting the tablet PC by means of a magnetic force when the terminal group is connected to the tablet PC, the chassis has a groove portion recessed from the front surface of the chassis and extending in the extending direction, the groove portion includes a first groove extending in the extending direction so that the one edge of the tablet PC in the standing state is able to be retained in the first groove, and a pair of second grooves disposed on respective both sides of the first groove in the extending direction and extending in the extending direction so that the pair of retained frame portions is retained in the standing state in the pair of second grooves, the second groove includes a groove base surface like a curved concave surface, the groove base surface extending in the extending direction, the groove base surface being in contact with the outer surface portion, and a second end face positioned on the inside end portion of the second groove in the extending direction, the second end face being directed outward in the extending direction, the second end face being opposed to the first end face in the standing state, and the terminal group is disposed in the first groove.

An electronic apparatus according to one aspect of the present invention includes the above-described tablet PC case, and the tablet PC to be housed in the first protective cover.

According to a tablet PC case and an electronic apparatus according to the aspects of the present invention, it is possible to prevent damage to the tablet PC case, to stabilize the posture of the tablet PC in a standing state, and to readily establish wired electrical connection between the tablet PC and an input device while keeping a good appearance.

DETAILED DESCRIPTION OF THE INVENTION

Figure 1:
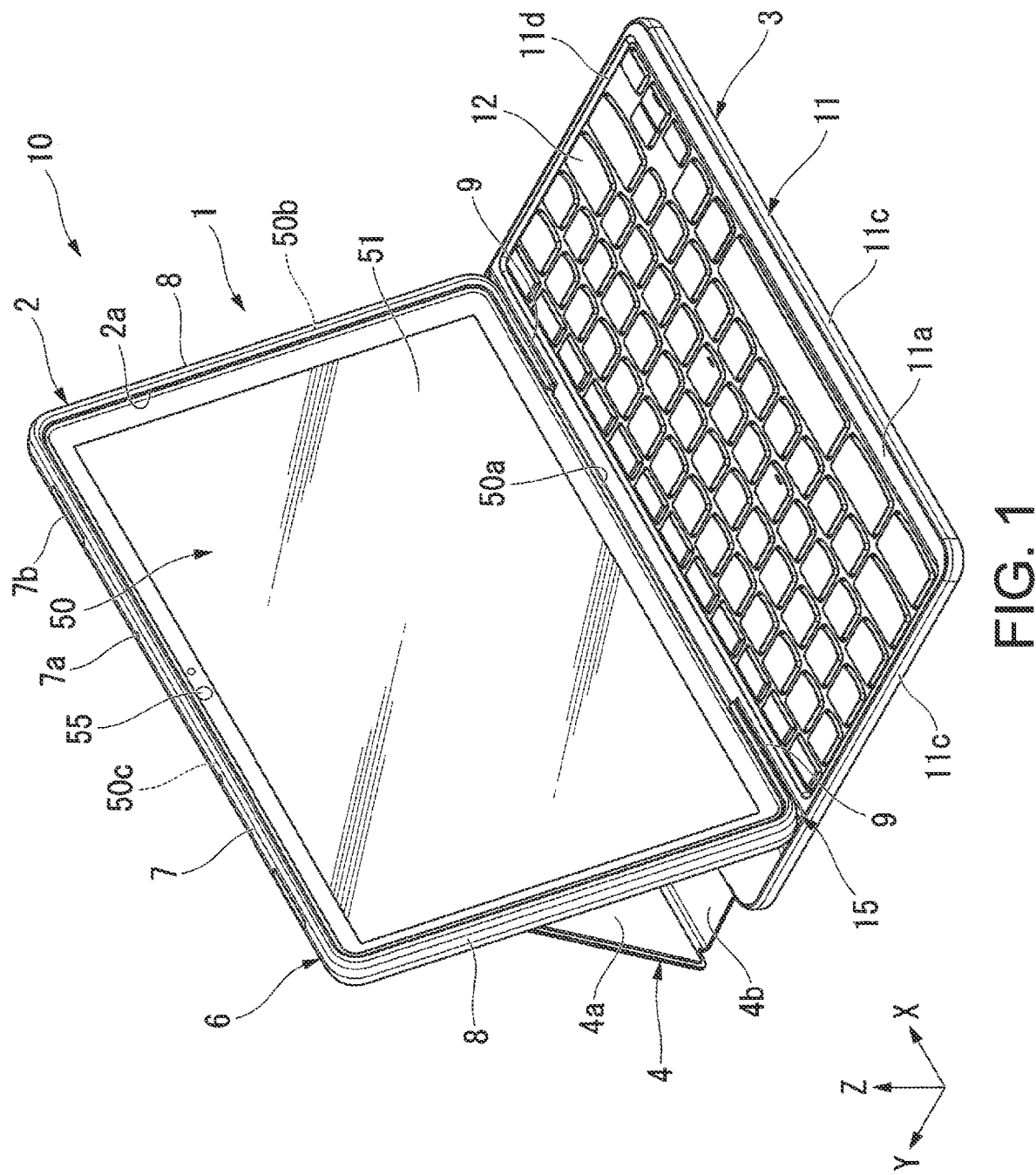
FIG. 1 is a perspective view of an electronic apparatus according to an embodiment of the present invention in a use state of an input device.

A tablet PC case 1 and an electronic apparatus 10 according to an embodiment of the present invention will now be described referring to the drawings.

In this embodiment, an XYZ rectangular coordinate system is set in each drawing to describe the positional relationship of the respective structures. Specifically, in the following, a direction along the X axis will be referred to as a right-left direction; a direction along the Y axis will be referred to as a front-rear direction; and a direction along the Z axis will be referred to as an up-down direction. As to the X axial direction, the +X side is the right side, and the −X side is the left side. As to the Y axial direction, the +Y side is the rear side; and the −Y side is the front side. As to the Z axial direction, the +Z side is the upper side, and the −Z side is the lower side.

Figure 15:
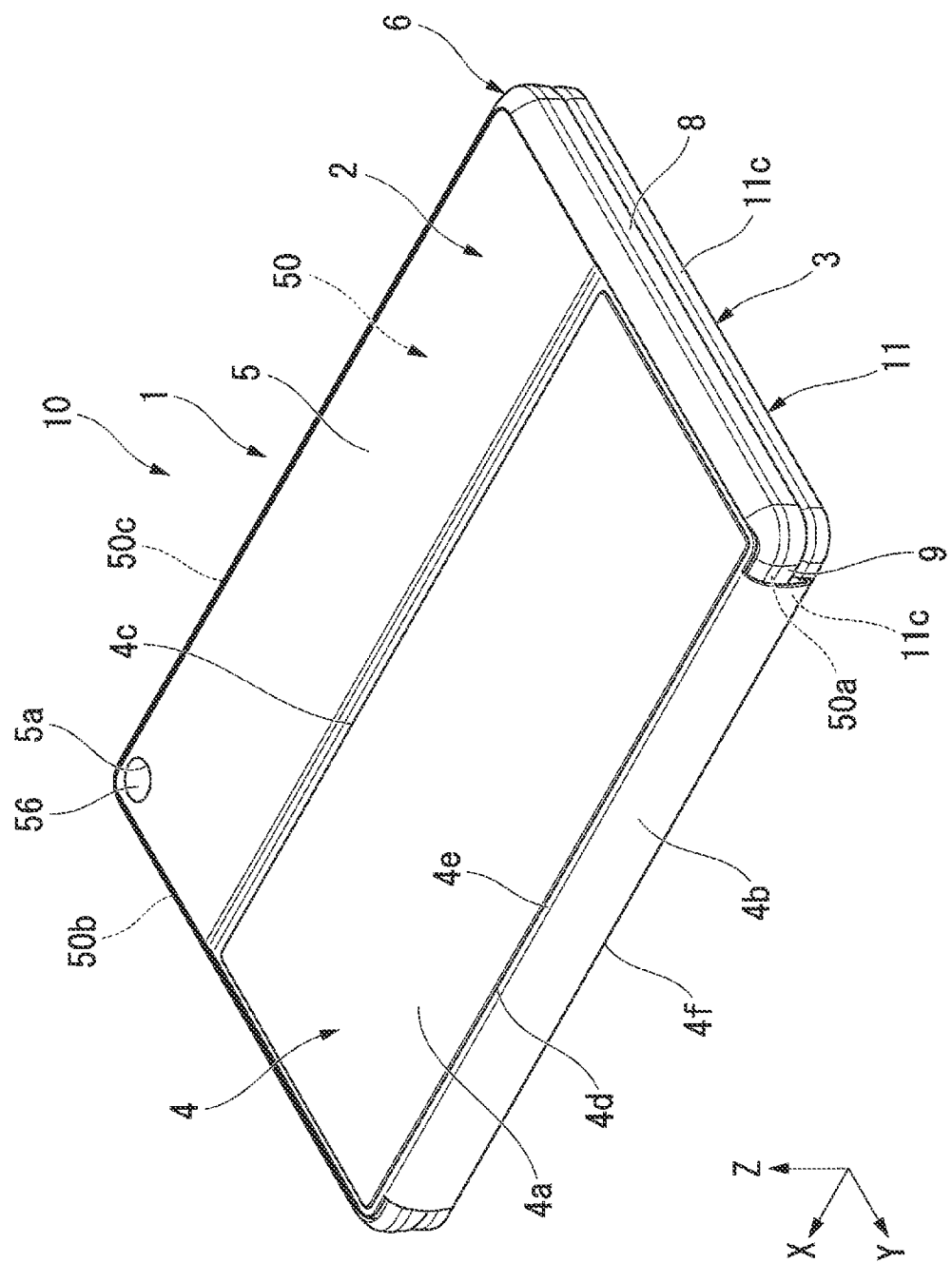
FIG. 15 is a perspective view of an electronic apparatus according to an embodiment of the present invention in a folded state.
Figure 16:
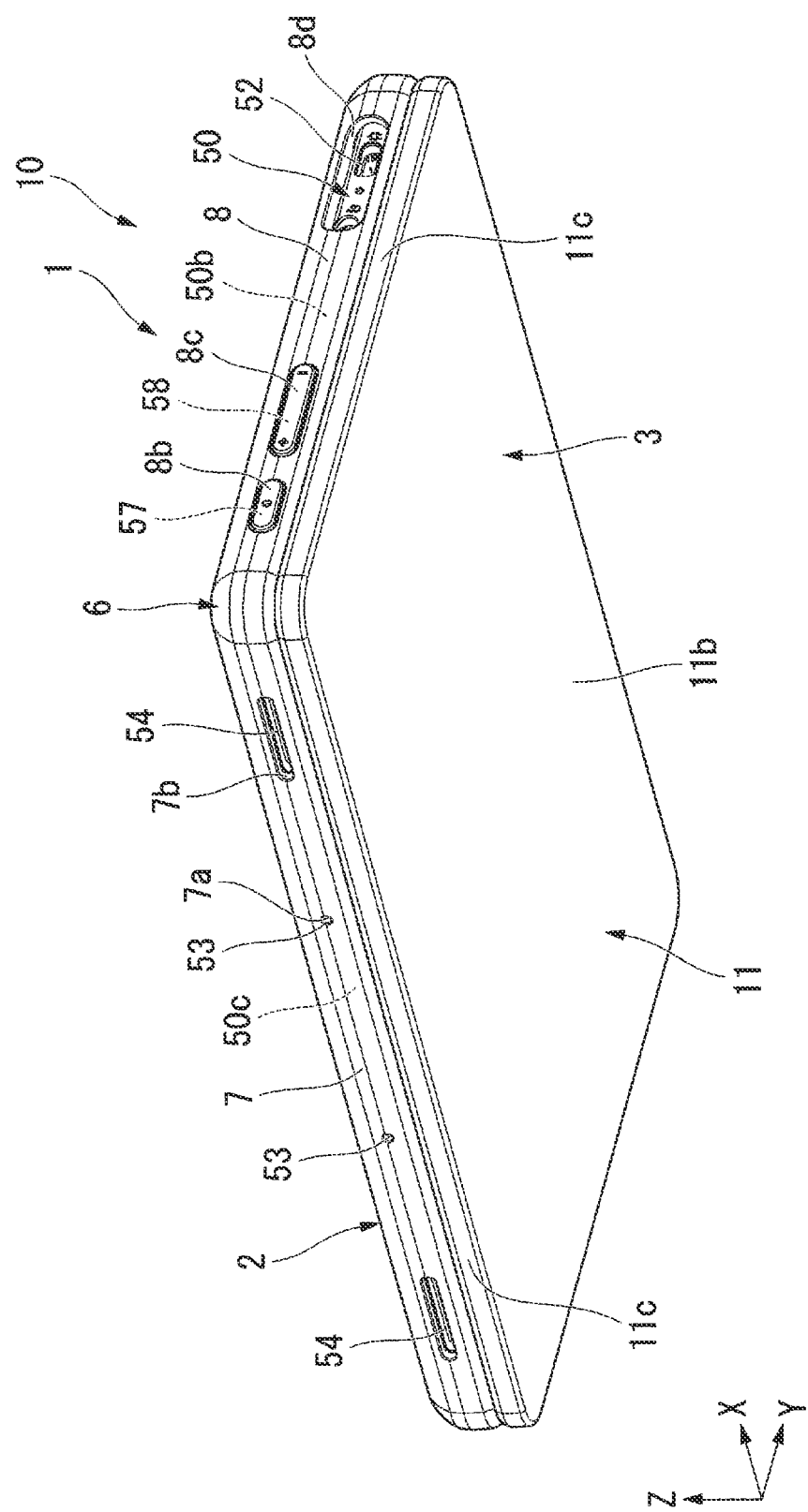
FIG. 16 is a perspective view of an electronic apparatus according to an embodiment of the present invention in a folded state.

As illustrated in FIG. 1, FIG. 15, and FIG. 16, the electronic apparatus 10 in this embodiment includes a tablet PC 50 and a tablet PC case 1. The tablet PC 50 has a plate external shape, and is removably mounted in the tablet PC case 1. Specifically, the tablet PC 50 is housed in a first protective cover 2, to be described later, of the tablet PC case 1.

Note that, in this embodiment, FIG. 1, FIG. 15, and FIG. 16 illustrate the electronic apparatus 10, that is, the tablet PC 50 mounted in the tablet PC case 1, while the drawings other than FIG. 1, FIG. 15, and FIG. 16 illustrate solely the tablet PC case 1.

In this embodiment, as illustrated in FIG. 1, a state in which the tablet PC 50 is housed in the first protective cover 2 of the tablet PC case 1, standing on a second protective cover 3, to be described later, that is, the first protective cover 2 stands on the second protective cover 3, is referred to as a standing state, a standing state of the tablet PC 50, or a standing posture. The standing state of the tablet PC 50 is a state in which one edge 50a of the outer circumferential portion of the tablet PC 50 is in contact with a chassis 11, to be described later, of the second protective cover 3, and a display (a display surface) 51, to be described later, of the tablet PC 50 is directed toward a user, not illustrated, or the front side (the −Y side).

With this electronic apparatus 10, when the tablet PC 50 is in the standing state, the tablet PC 50 is electrically connected to an input unit (an input device) 12, to be described later, of the second protective cover 3, so that input via the input unit 12, or use of the input device, is enabled. Thus, the standing state of the tablet PC 50 can be rephrased as a state in which an input device is used, or a use state of an input device. FIG. 1 to FIG. 10 illustrate the use state of the input device.

As illustrated in FIG. 15 and FIG. 16, a state in which the display 51 of the tablet PC 50 is opposed to the front surface (a first cover 11a to be described later) of the chassis 11 of the second protective cover 3, that is, the tablet PC 50 and the first protective cover 2 and the second protective cover 3 are folded so as to be disposed one on the other is referred to as a folded state or a folded posture.

When the electronic apparatus 10 is in the folded state, electrical connection between the tablet PC 50 and the input unit 12 is disconnected, so that input via the input unit 12, that is, use of an input device, is disabled. Thus, the folded state can be rephrased as a state in which the input device is not used. FIG. 15 to FIG. 22 illustrates the folded state.

As illustrated in FIG. 1, FIG. 15, and FIG. 16, the tablet PC 50 has a quadrilateral plate external shape. Specifically, the tablet PC 50 has an external shape like a rectangular plate or a low-profile rectangular parallelepiped. Thus, the four edges constituting the outer circumferential portion of the tablet PC 50 include a pair of longer edges and a pair of shorter edges. The pair of longer edges extends in the right-left direction.

The tablet PC 50 includes the display 51, a tablet terminal, not illustrated, a tablet magnet portion, not illustrated, a power button 57, a volume adjustment button 58, a plug connection unit 52, a microphone unit 53, a speaker unit 54, a front camera unit 55, and a rear camera unit 56.

The display 51 is disposed on one of a pair of plate surfaces of the tablet PC 50. The display 51 is, for example, a liquid crystal display, an organic electroluminescent (EL) display, or the like. With the tablet PC 50 in the standing state, the display 51 is directed forward (the −Y side). Meanwhile, in the folded state, the display 51 is directed downward (the −Z side).

Although not particularly illustrated, the tablet terminal is disposed on one edge 50*a*, or one of the pair of longer edges of the four edges of the outer circumferential portion of the tablet PC 50. That is, the tablet terminal is disposed on the lateral surface of the tablet PC 50. Note that the one edge 50*a* is an edge positioned on the lower end portion of the tablet PC 50 when the tablet PC 50 is in the standing state, as illustrated in FIG. 1. That is, the one edge 50*a* is a lower edge of the tablet PC 50, the lower edge being opposed to the chassis 11 of the second protective cover 3. In other words, the one edge 50*a* is an edge of the outer circumferential portion of the tablet PC 50, the edge being opposed to the second protective cover 3 in the standing state. A plurality of the tablet terminals is disposed exposed on the one edge 50*a* of the tablet PC 50. The plurality of tablet terminals can be rephrased as a tablet terminal group. The plurality of tablet terminals is disposed at intervals in the extending direction of the one edge 50*a*. In this embodiment, the extending direction of the one edge 50*a* corresponds to the right-left direction (the X axial direction).

Although not particularly illustrated, the tablet magnet portion is held inside the tablet PC 50. Specifically, the tablet magnet portion is disposed along the one edge 50*a* of the outer circumferential portion in the tablet PC 50. That is, the tablet magnet portion is positioned inside the one edge 50*a* of the tablet PC 50, and extends in the right-left direction. The tablet magnet portion is disposed on the lateral surface of the tablet PC 50.

As illustrated in FIG. 16, the power button 57, the volume adjustment button 58, and the plug connection unit 52 are disposed on an edge 50*b*, or an edge of the pair of shorter edges, or an edge different from the one edge 50*a* of the four edges of the outer circumferential portion of the tablet PC 50. The one edge 50*b* is an edge positioned on the right side of the pair of shorter edges of the tablet PC 50, that is, the right edge of the tablet PC 50. The power button 57, the volume adjustment button 58, and the plug connection unit 52 are disposed at intervals on the one edge 50*b*.

The microphone unit 53 and the speaker unit 54 are disposed on an edge 50*c*, or an edge of the pair of longer edges, or an edge different from the edges 50*a*, 50*b* of the four edges of the outer circumferential portion of the tablet PC 50. As illustrated in FIG. 1, the edge 50*c* is an edge positioned on the upper end portion of the tablet PC 50 when the tablet PC 50 is in the standing state, or the upper edge of the tablet PC 50.

As illustrated in FIG. 16, a plurality of the microphone units 53 is provided on the one edge 50*c* at intervals in the right-left direction. A plurality of the speaker units 54 is provided on the one edge 50*c* at intervals in the right-left direction.

As illustrated in FIG. 1, the front camera unit 55 is disposed on an edge portion of one of the pair of plate surfaces of the tablet PC 50, specifically, on the upper edge portion of one plate surface, the upper edge portion being in adjacent to the one edge 50*c*.

As illustrated in FIG. 15, the rear camera unit 56 is disposed at a corner of the other one of the pair of plate surfaces of the tablet PC 50, specifically, at a corner (the upper right corner) of the other plate surface, the corner being adjacent to the edges 50*b*, 50*c*.

As illustrated in FIG. 1 to FIG. 9, the tablet PC case includes the first protective cover 2, the second protective cover 3, and a connection unit 4.

The first protective cover 2 has an opening 2*a* in which the display 51 of the tablet PC 50 is exposed, and can house the tablet PC 50 therein. The first protective cover 2 is made of, for example, elastomer, such as thermo plastic polyurethane, or the like. The first protective cover 2 is elastically deformable.

The first protective cover 2 includes a rear plate 5 and a frame body 6.

The rear plate 5 is shaped like a plate. The rear plate 5 is shaped like a quadrilateral plate, specifically, a rectangular plate. Of the four edges of the outer edge portion of the rear plate 5, a pair of longer edges extend in the right-left direction. The rear plate 5 is opposed to the other plate surface of the pair of plate surfaces of the tablet PC 50. The rear plate 5 is in contact with the other plate surface of the tablet PC 50, and covers the other plate surface.

The rear plate 5 has a rear camera hole 5*a*. The rear camera hole 5*a* is shaped like a round hole penetrating the rear plate 5 and open on the pair of plate surfaces of the rear plate 5. The rear camera hole 5*a* is disposed opposed to the rear camera unit 56 of the tablet PC 50.

The frame body 6 is connected to the outer edge portion of the rear plate 5, covers the outer circumferential portion of the tablet PC 50, and can hold the tablet PC 50. The frame body 6 is opposed to the four edges of the outer circumferential portion of the tablet PC 50. The frame body 6 covers the respective entire lengths of the pair of shorter edges and the one edge 50*c* of the pair of longer edges of the four edges of the outer circumferential portion of the tablet PC 50. In addition, the frame body 6 covers at least the both end portions of the one edge 50*a* of the four edges of the outer circumferential portion of the tablet PC 50.

The frame body 6 includes an upper frame portion 7, a pair of side frame portion 8, and a pair of retained frame portions 9.

The upper frame portion 7 extends along the one edge 50*c* of the pair of longer edges of the outer circumferential portion of the tablet PC 50. The upper frame portion 7 is opposed to the one edge 50*c* of the tablet PC 50. The upper frame portion 7 is in contact with the one edge 50*c* of the tablet PC 50, and covers the one edge 50*c*. The outer circumferential surface of the upper frame portion 7 is like a curved convex surface extending in the right-left direction. The inner circumferential surface of the upper frame portion 7 is like a curved concave surface extending in the right-left direction. With the tablet PC 50 in the standing state, the cross sectional shape of the upper frame portion 7 perpendicular to the right-left direction has an upward convex C-shape.

The upper frame portion 7 includes a microphone hole 7*a* and a speaker hole 7*b*.

The microphone hole 7*a* is shaped like a round hole penetrating the upper frame portion 7 in a direction in which the upper frame portion 7 is thicker. The microphone hole 7*a* is disposed opposed to the microphone unit 53 of the tablet PC 50. A plurality of the microphone holes 7*a* is provided on the upper frame portion 7 at intervals in the right-left direction.

The speaker hole 7*b* is shaped like a long hole extending in the right-left direction and penetrating the upper frame portion 7 in a direction in which the upper frame portion 7 is thicker. The speaker hole 7*b* is disposed opposed to the speaker unit 54 of the tablet PC 50. A plurality of the speaker holes 7*b* is provided on the upper frame portion 7 at intervals in the right-left direction.

A pair of side frame portions 8 extends along the pair of respective shorter edges of the outer circumferential portion of the tablet PC 50. The side frame portion 8 is opposed to the shorter edge of the tablet PC 50. The side frame portion 8 is in contact with the shorter edge of the tablet PC 50, and covers the shorter edge. The outer circumferential surface of the side frame portion 8 is like a curved convex surface extending in the extending direction of the shorter edge. The inner circumferential surface of the side frame portion 8 is like a curved concave surface extending in the extending direction of the shorter edge. Of the pair of side frame portions 8, the side frame portion positioned on the left side has a cross section perpendicular to the extending direction of the shorter edge, the cross section being shaped like a leftward convex C-shape. Of the pair of side frame portions 8, the side frame portion 8 positioned on the right side has a cross section perpendicular to the extending direction of the shorter edge, the cross section being shaped like a rightward convex C-shape.

The side frame portion 8 includes a cushion rib 8a, a power operation unit 8b, a volume adjustment unit 8c, and a plug connection hole 8d.

Figure 2:
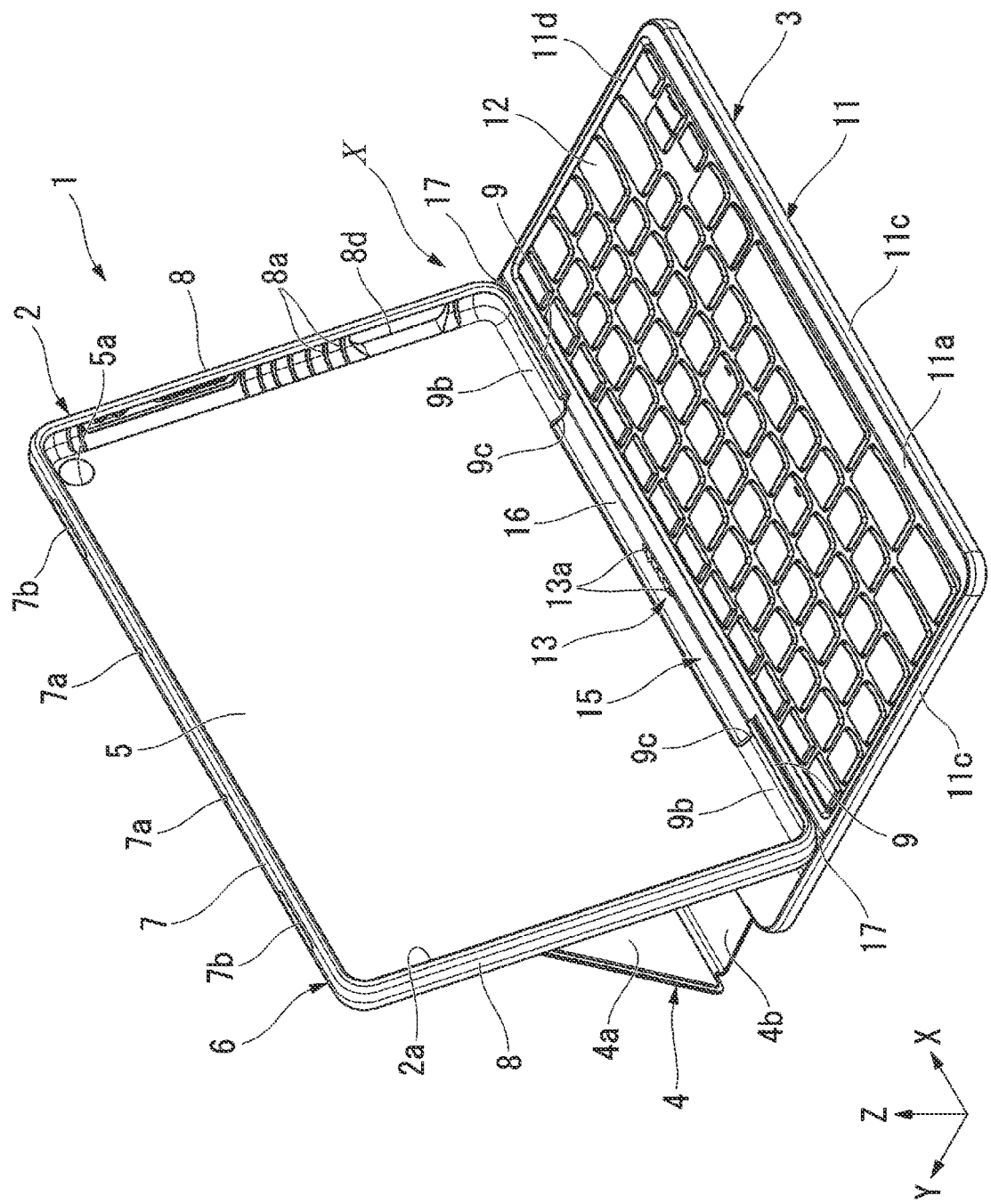
FIG. 2 is a perspective view of a tablet PC case according to an embodiment of the present invention in a use state of an input device.

As illustrated in FIG. 2, the cushion rib 8a is disposed on the inner circumferential surface of the side frame portion 8 and in contact with the shorter edge of the outer circumferential portion of the tablet PC 50. The cushion rib 8a extends in a direction orthogonal to the extending direction of the shorter edge of the tablet PC 50, that is, a direction orthogonal to the extending direction of the side frame portion 8. A plurality of the cushion ribs 8a is disposed at intervals in the extending direction of the side frame portion 8.

Figure 3:
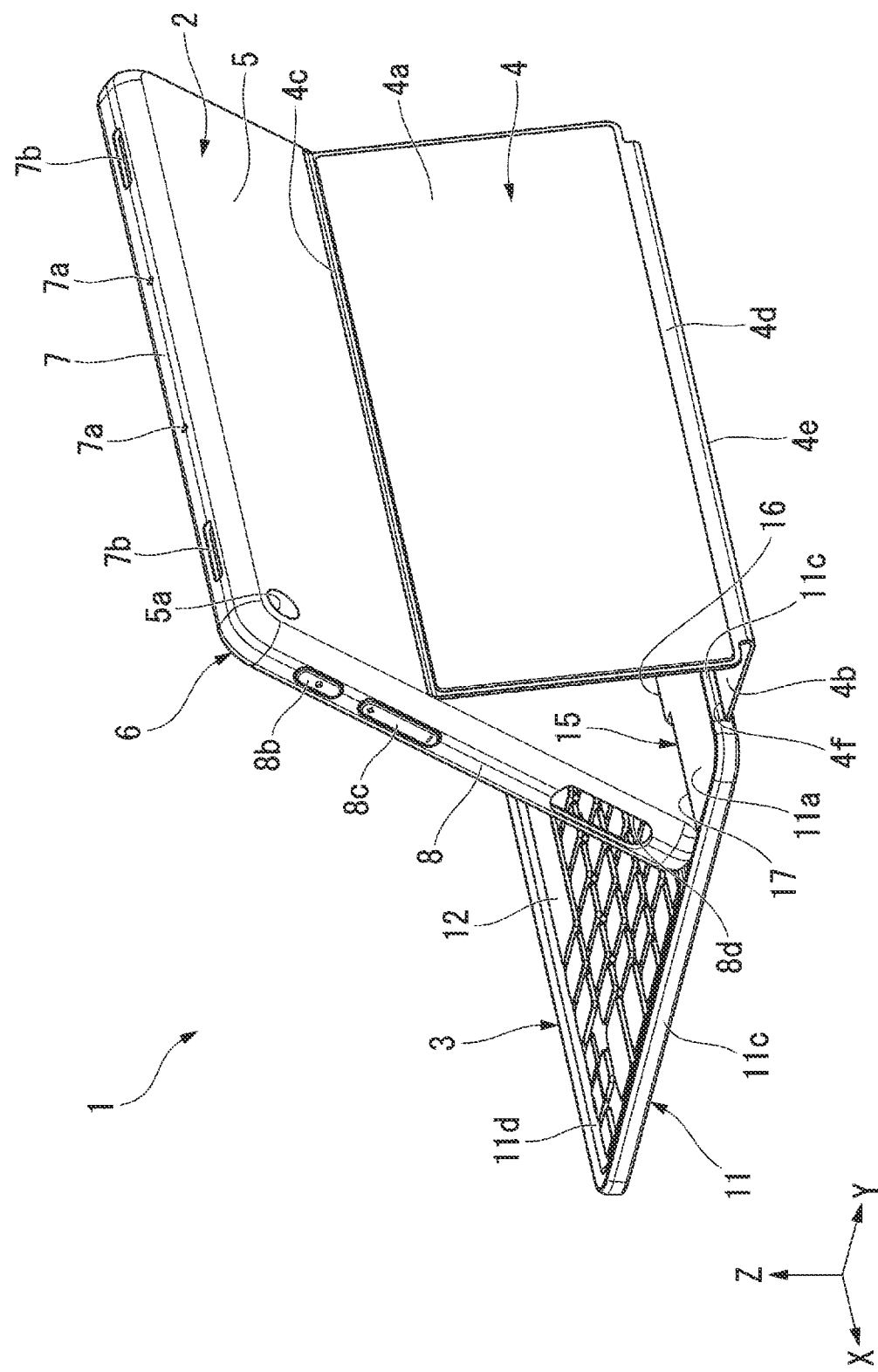
FIG. 3 is a perspective view of a tablet PC case according to an embodiment of the present invention in a use state of an input device.
Figure 4:
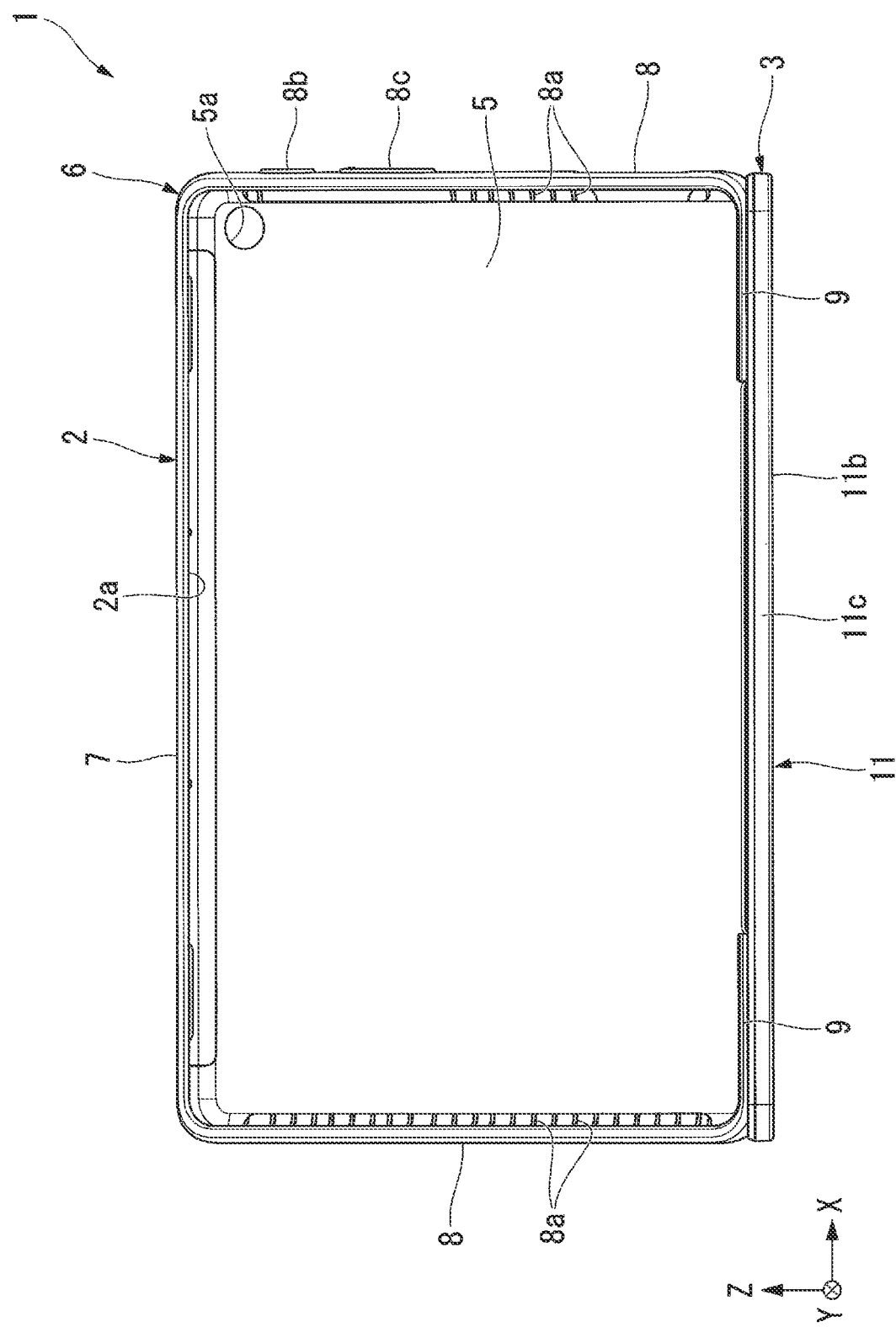
FIG. 4 is a front view of a tablet PC case according to an embodiment of the present invention in a use state of an input device.
Figure 5:
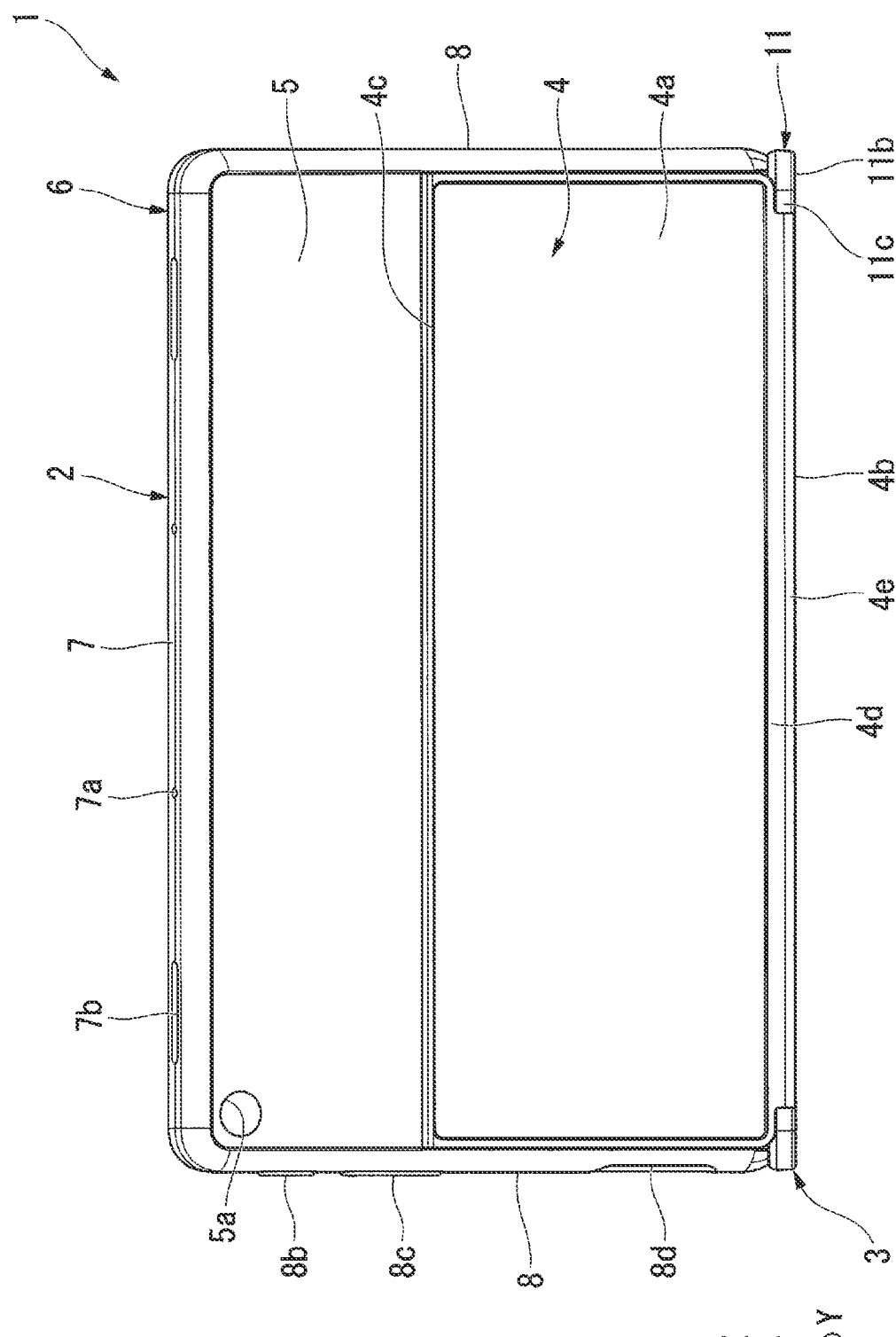
FIG. 5 is a rear view of a tablet PC case according to an embodiment of the present invention in a use state of an input device.
Figure 6:
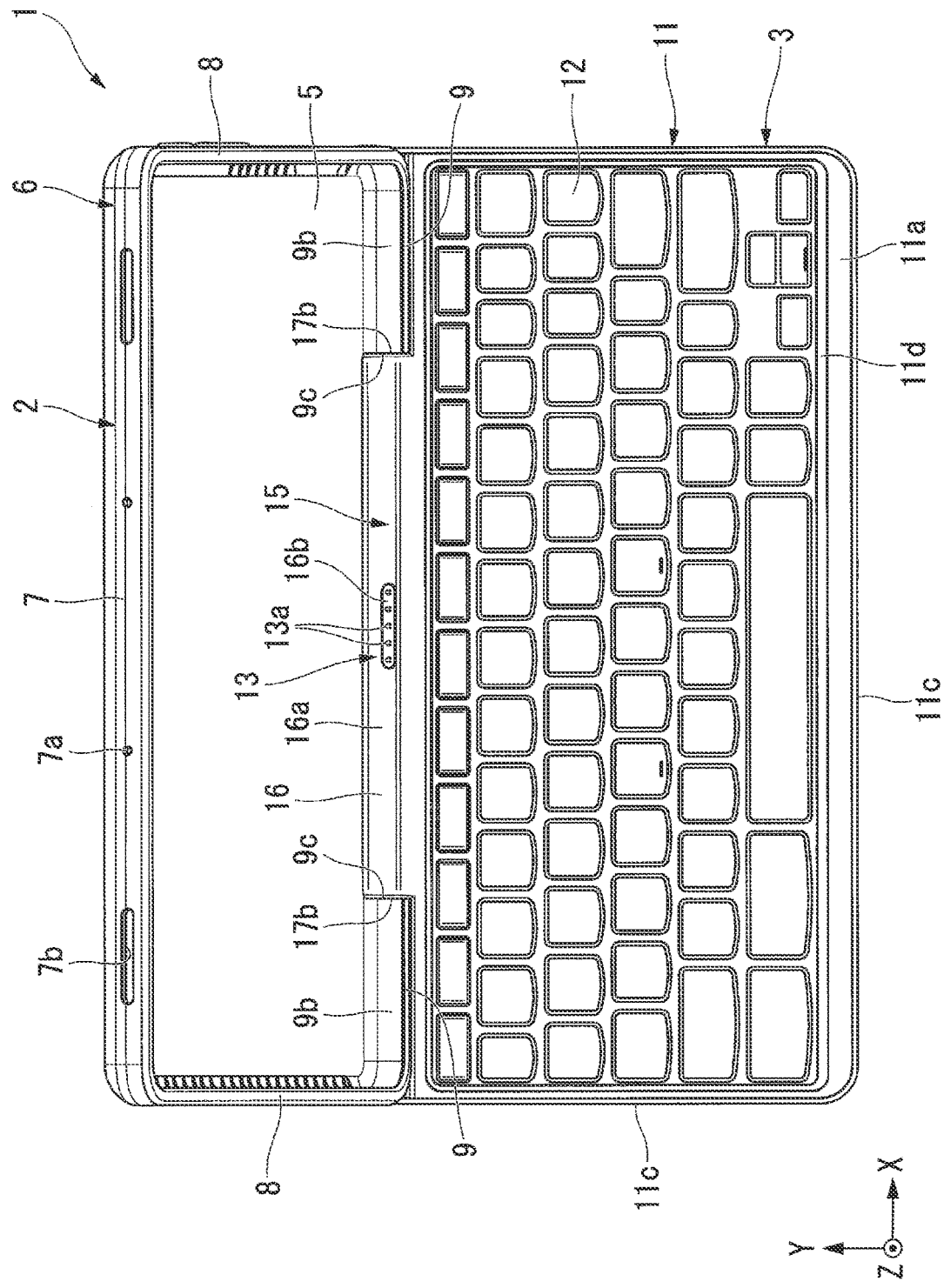
FIG. 6 is a plan view of a tablet PC case according to an embodiment of the present invention in a use state of an input device.
Figure 7:
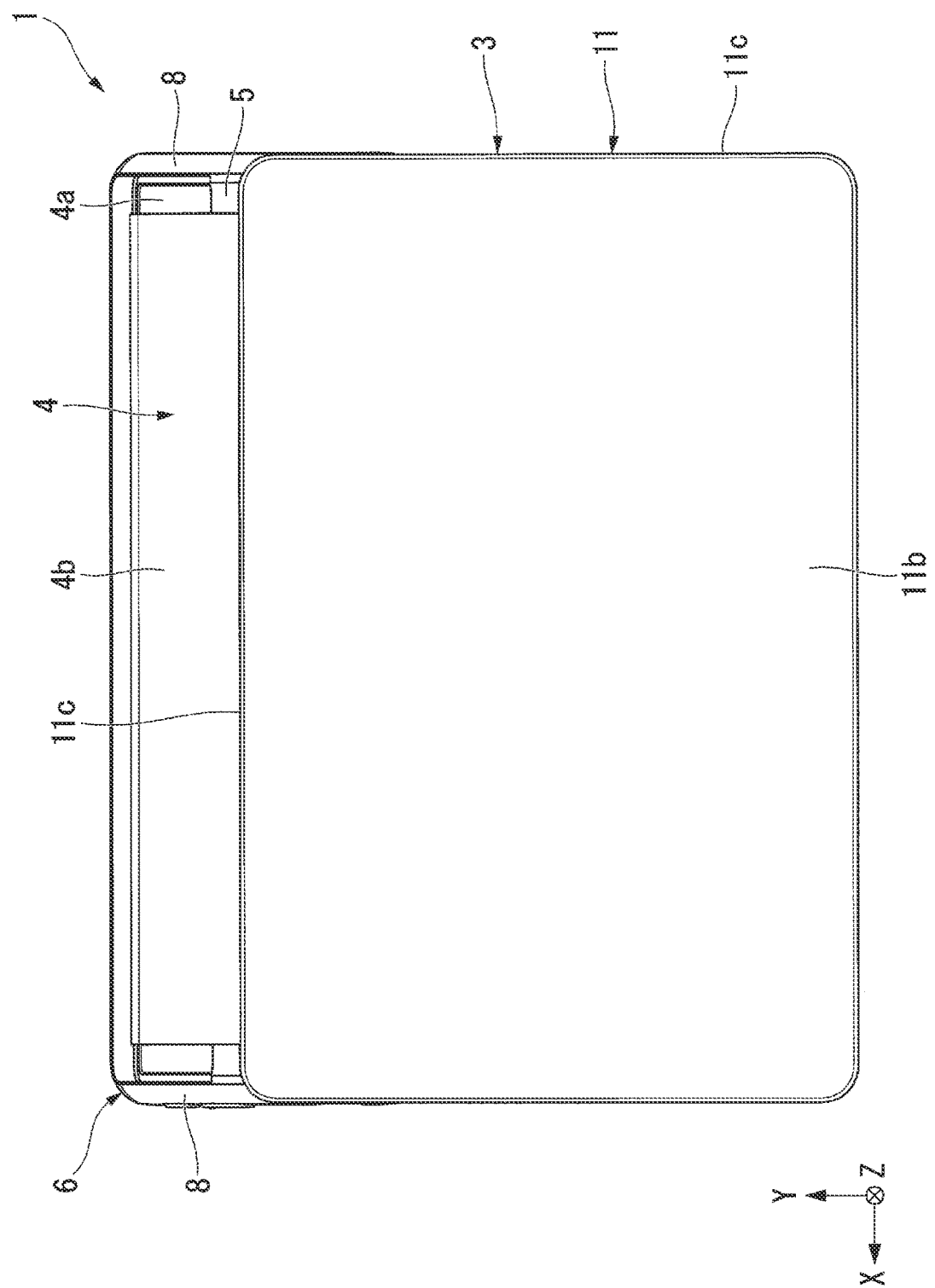
FIG. 7 is a bottom view of a tablet PC case according to an embodiment of the present invention in a use state of an input device.
Figure 8:
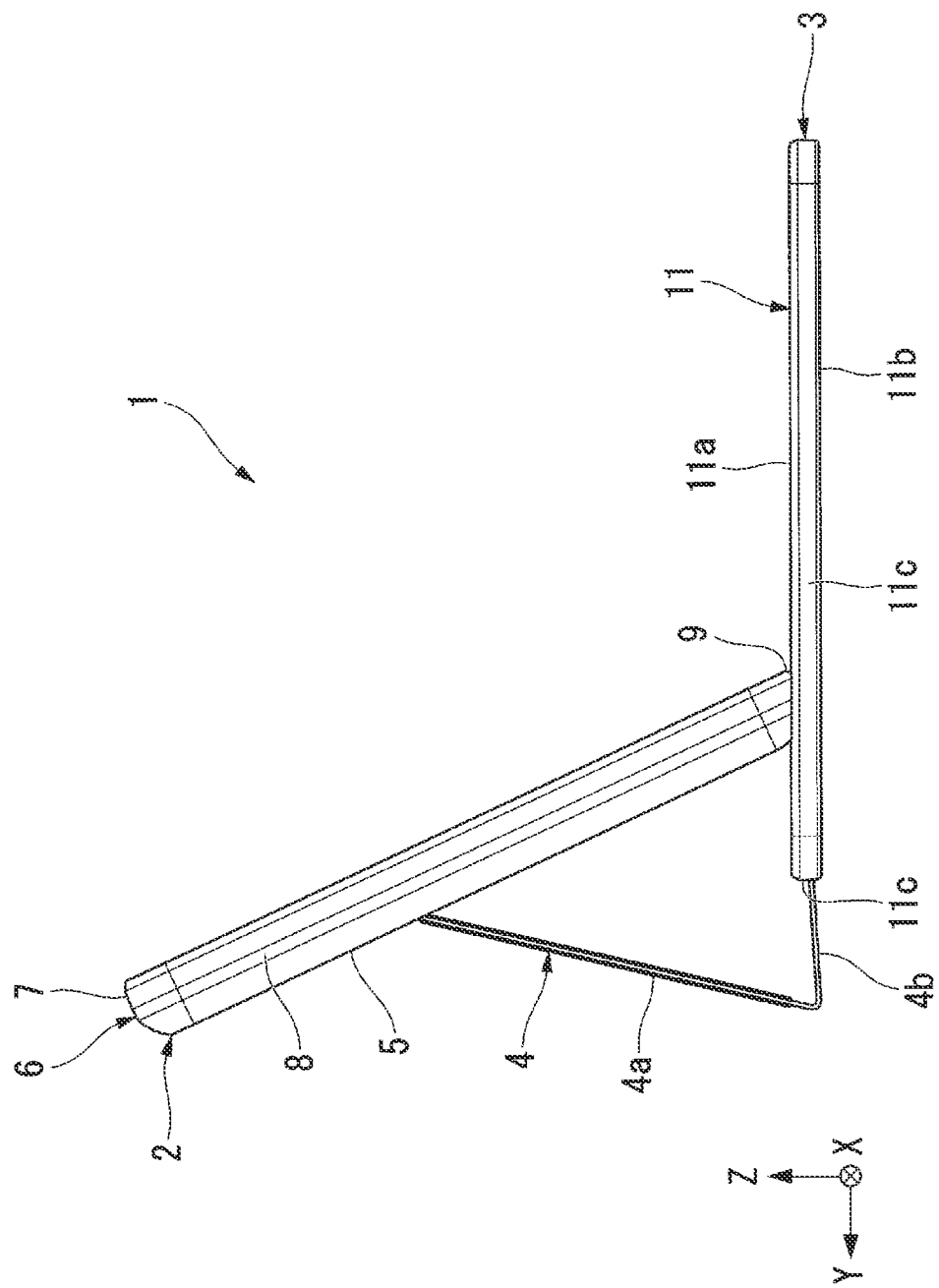
FIG. 8 is a left side view of a tablet PC case according to an embodiment of the present invention in a use state of an input device.
Figure 9:
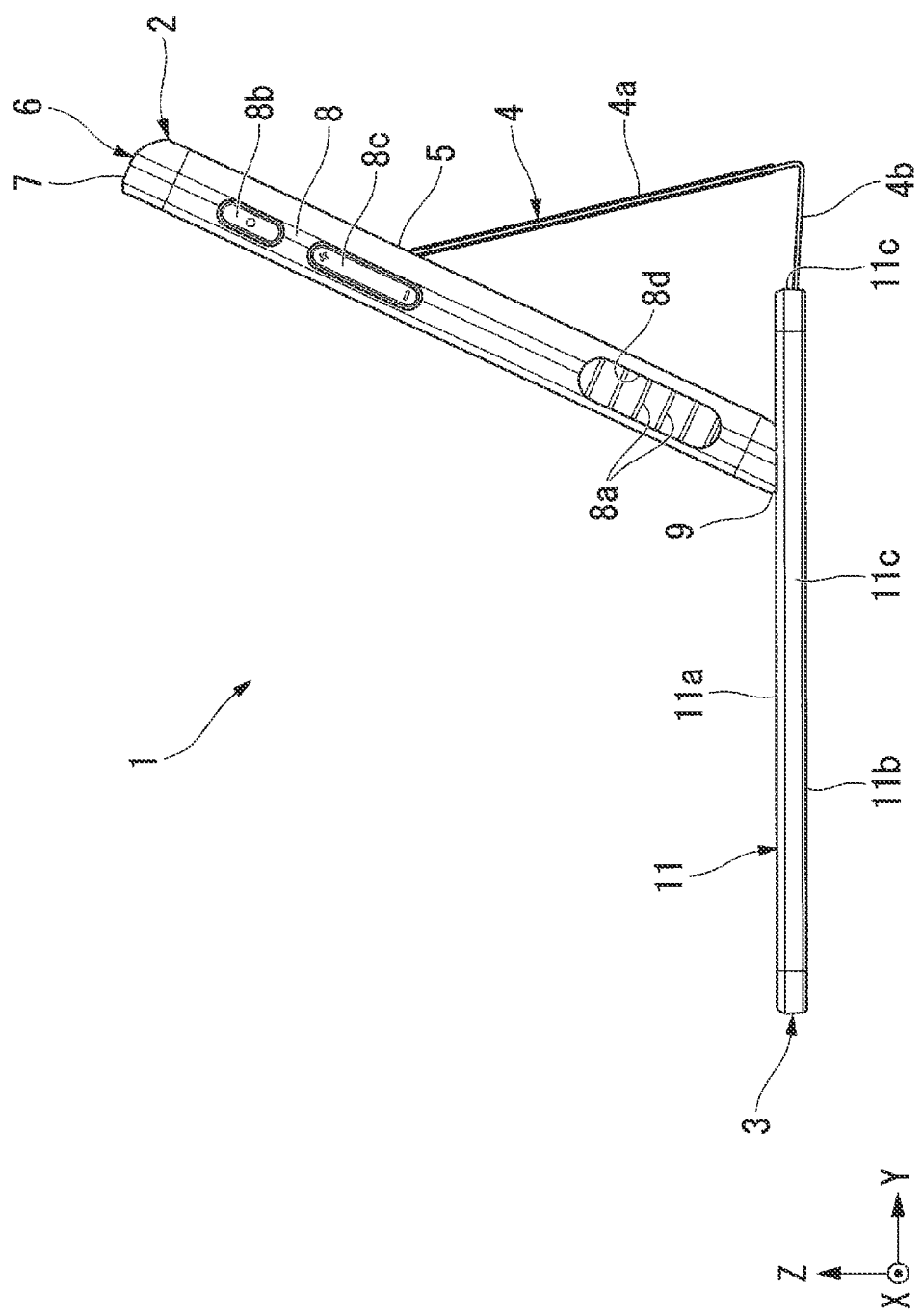
FIG. 9 is a right side view of a tablet PC case according to an embodiment of the present invention in a use state of an input device.
Figure 10:
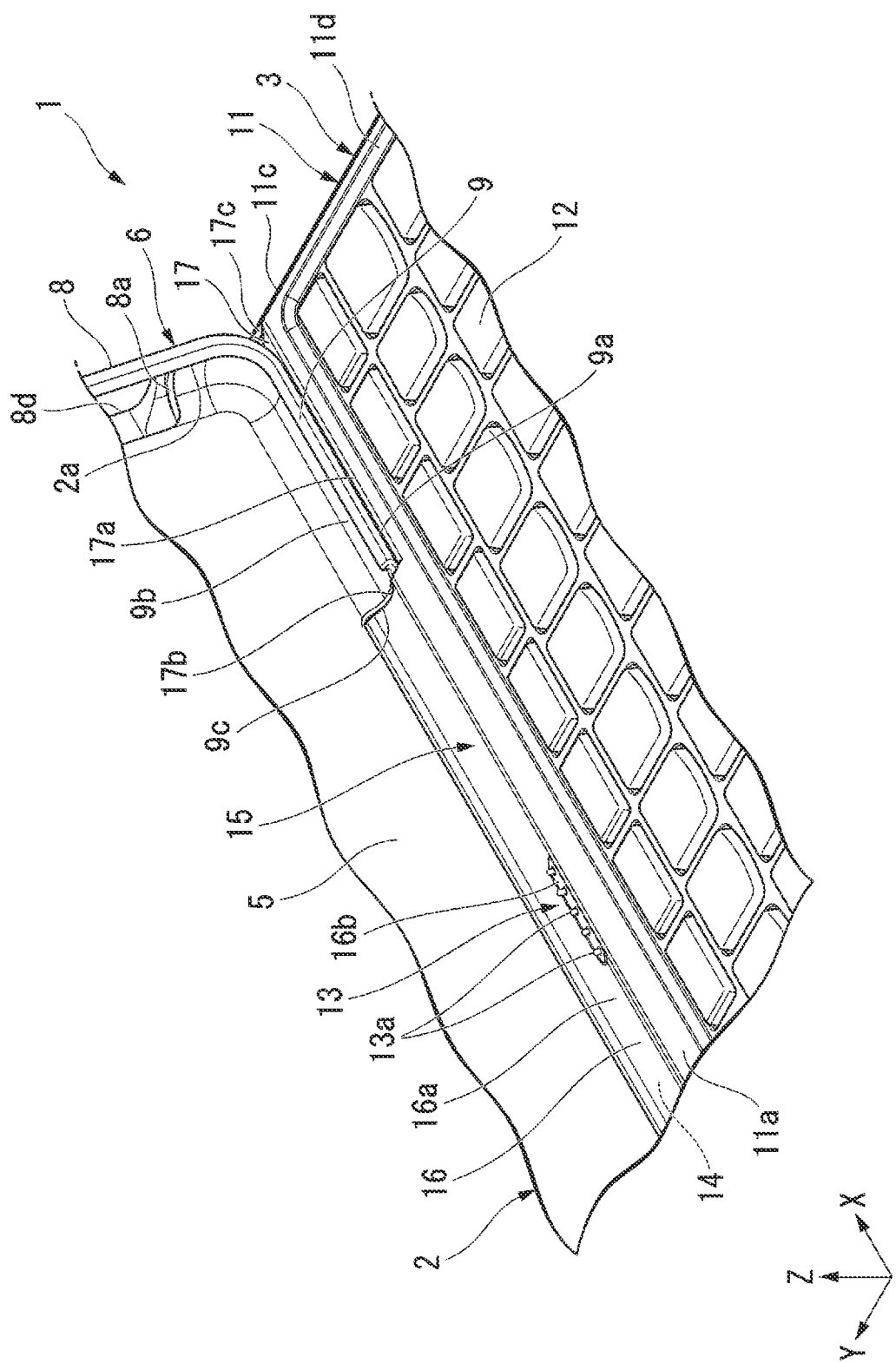
FIG. 10 is an enlarged perspective view of the X portion in FIG. 2.
Figure 11:
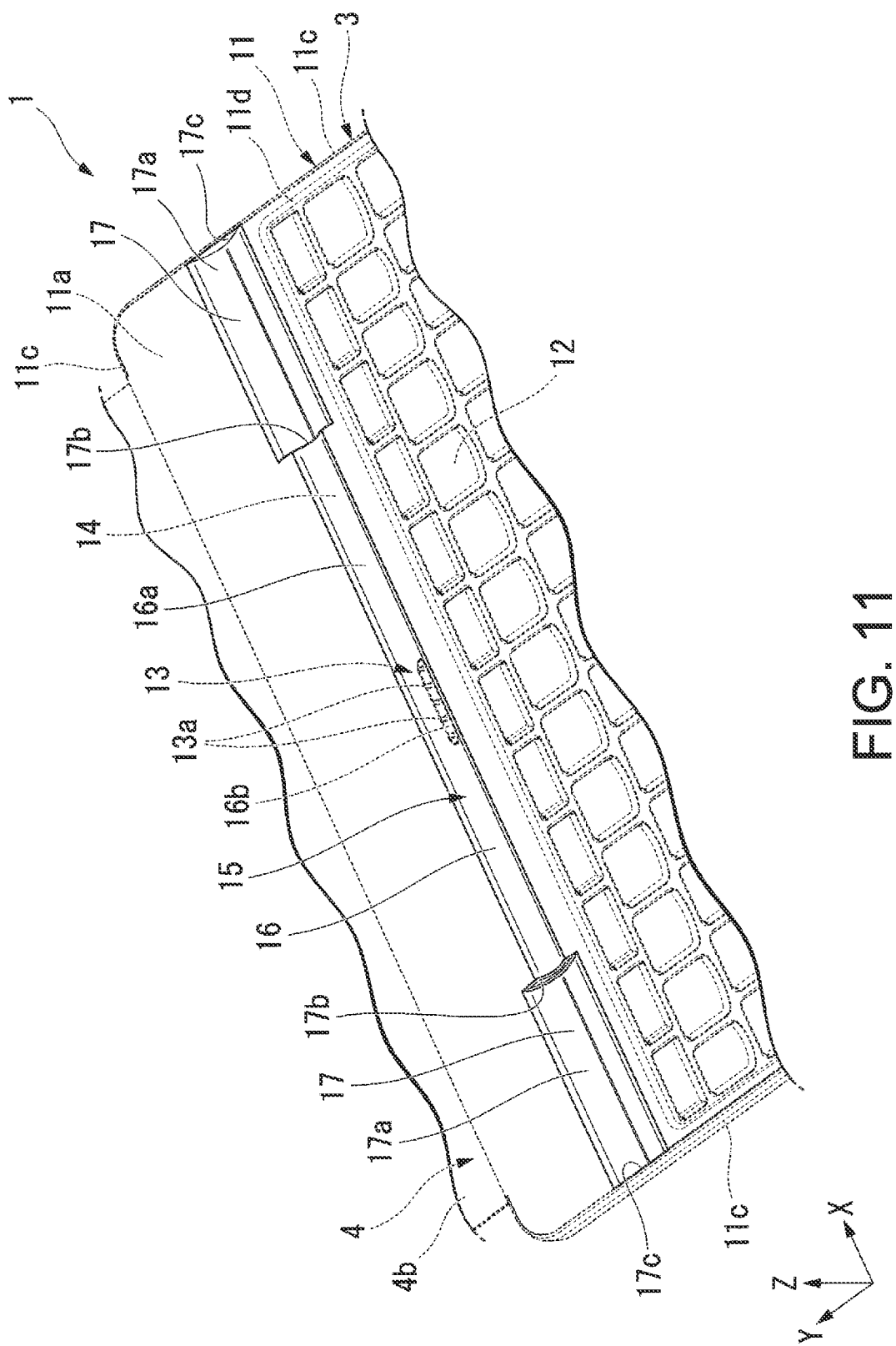
FIG. 11 is a partial perspective view of a major portion of a tablet PC case according to an embodiment of the present invention, the major portion being illustrated with a solid line.

As illustrated in FIG. 3 and FIG. 16, the power operation unit 8b, the volume adjustment unit 8c, and the plug connection hole 8d are disposed on the side frame portion 8 positioned on the right side (the +X side) of the pair of side frame portions 8.

The power operation unit 8b is disposed opposed to the power button 57 of the tablet PC 50. In response to a user's operating the power operation unit 8b, the power button 57 is pressed via the power operation unit 8b, whereby the power is turned on or off.

The volume adjustment unit 8c is disposed opposed to the volume adjustment button 58 of the tablet PC 50. In response to a user's operating the volume adjustment unit 8c, the volume adjustment button 58 is pressed via the volume adjustment unit 8c, whereby the sound volume increases or decreases.

The plug connection hole 8d is a long opening extending in the extending direction of the side frame portion 8 and penetrating the side frame portion 8 in a direction in which the side frame portion 8 is thicker. The plug connection hole 8d is disposed opposed to the plug connection unit 52 of the tablet PC 50.

As illustrated in FIG. 1, FIG. 2, FIG. 10, and FIG. 14, the pair of retained frame portions 9 extends along the one edge 50a of the pair of longer edges of the outer circumferential portion of the tablet PC 50. The retained frame portion 9 is opposed to the one edge 50a of the tablet PC 50. The retained frame portion 9 is in contact with the one edge 50a of the tablet PC 50, and covers a part of the one edge 50a in the extending direction (the right-left direction). The pair of retained frame portions 9 is disposed at an interval in the extending direction in which the one edge 50a extends. Specifically, the pair of retained frame portions 9 is disposed on the respective both end portions of the one edge 50a in the extending direction.

The retained frame portion 9 has a cross section perpendicular to the extending direction of the one edge 50a (the right-left direction), that is shaped like a downward convex C-shape with the tablet PC 50 in the standing state.

Note that in the description below, unless otherwise stated, an "extending direction" refers to the extending direction of the one edge 50a, that is, the right-left direction. "Inward in the extending direction" refers to a direction from the respective both end portions of the one edge 50a in the extending direction toward the middle portion, and "outward in the extending direction" refers to a direction from the middle portion of the one edge 50a in the extending direction toward the respective both end portions.

The retained frame portion 9 includes an outer surface portion 9a like a curved convex surface extending in the extending direction, an inner surface portion 9b like a curved concave surface extending in the extending direction, and a first end face 9c positioned on the inside end portion of the retained frame portion 9 in the extending direction and directed inward in the extending direction.

The outer surface portion 9a has a cross section perpendicular to the external direction, that is shaped like a curved convex line. Note that the outer surface portion 9a may have a cross section perpendicular to the extending direction, whose shape includes a portion like a curved convex line and a portion like a straight line.

The inner surface portion 9b has a cross section perpendicular to the extending direction, the cross section being shaped like a curved concave line. Note that the inner surface portion 9b may have a cross section perpendicular to the extending direction, whose shape includes a portion like a curved concave line and a portion like a straight line.

The first end face 9c is like a flat surface expanding in a direction perpendicular to the extending direction, and is shaped like an arc as a whole when viewed in the extending direction. Of the pair of retained frame portions 9, the first end face 9c of the retained frame portion 9 positioned on the left side is directed rightward. Meanwhile, of the pair of retained frame portions 9, the first end face 9c of the retained frame portion 9 positioned on the right side is directed leftward. The respective first end faces 9c of the pair of retained frame portions 9 are disposed opposed to each other at an interval in the extending direction. In this embodiment, the distance between the respective first end faces 9c of the pair of retained frame portions 9 in the extending direction is longer than the length of each retained frame portion 9 in the extending direction.

As illustrated in FIG. 1, FIG. 15, and FIG. 16, the second protective cover 3 has a structure that covers the opening 2a of the first protective cover 2 to open or close the opening 2a.

Figure 12:
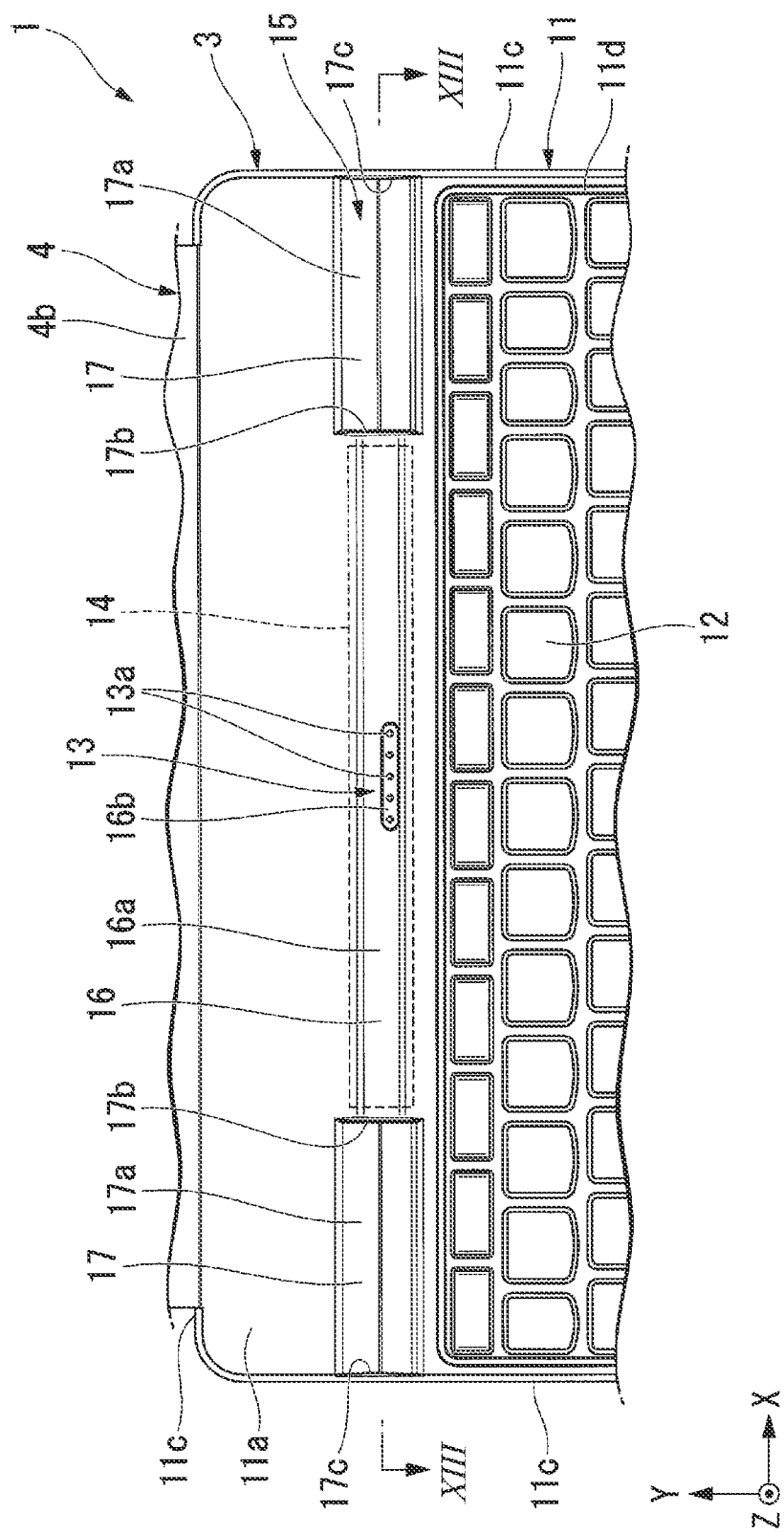
FIG. 12 is a partial plan view of a major portion of a tablet PC case according to an embodiment of the present invention.

As illustrated in FIG. 1, FIG. 2, and in FIG. 12, the second protective cover 3 includes the chassis 11, the input unit 12, a terminal group 13, and a magnet portion 14. The chassis 11 has a plate external shape. The input unit 12 is held in the chassis 11 and formed on the inner surface of the second protective cover 3. The terminal group 13 is exposed on the inner surface of the second protective cover 3 in a position closer to the connection unit 4 than the input unit 12, and is electrically connectable to the lateral surface of the tablet PC 50 in the standing state. The magnet portion 14 is disposed inside the chassis 11, and can attract the tablet PC 50 with a magnetic force when the terminal group 13 is connected to the tablet PC 50. Note that the inner surface of the second protective cover 3 corresponds to the front surface of the chassis 11 of the second protective cover 3, that is, a first cover 11a to be described later. In this embodiment, the input unit 12 is a keyboard. In the description below, the input unit 12 may be referred to as a keyboard 12 in some cases.

The chassis 11 is like a box, and has a storage space inside. The chassis 11 is made of resin, such as plastic, for example. The chassis 11 has a quadrilateral plate external shape. Specifically, the chassis 11 has an external shape like a rectangular plate or a low-profile rectangular parallelepiped. Thus, the four edges constituting the outer circumferential portion of the chassis 11 include a pair of longer edges and a pair of shorter edges. The pair of longer edges extends in the right-left direction.

Figure 17:
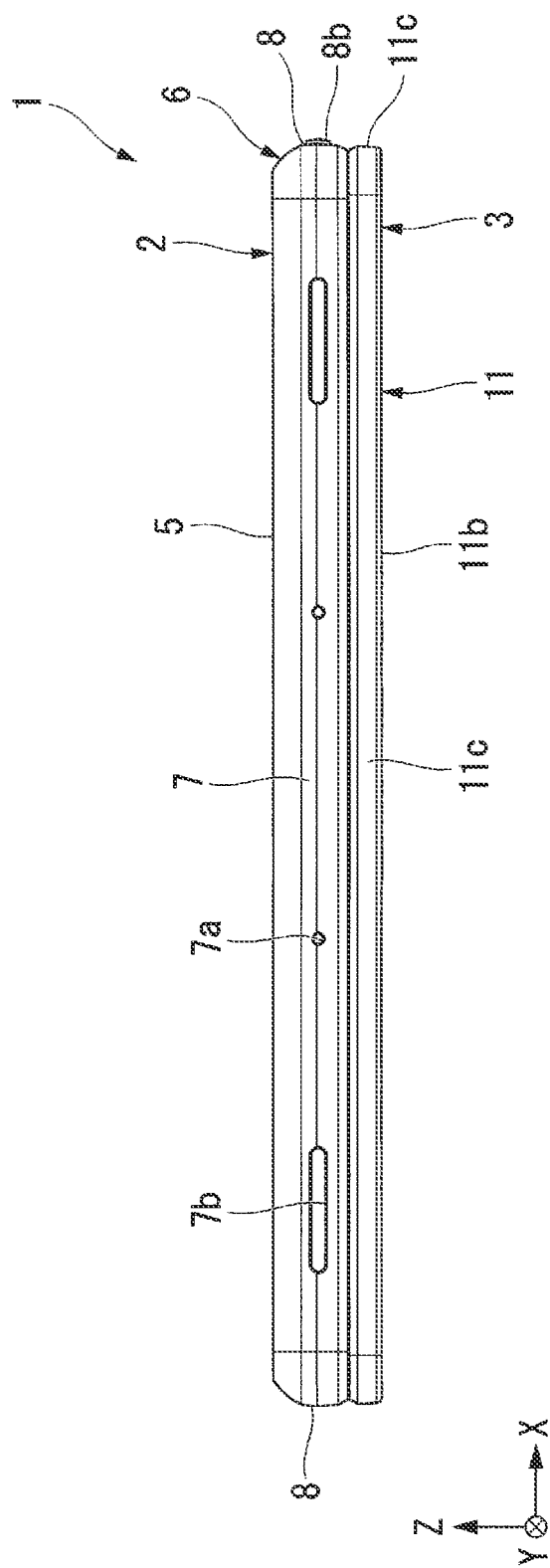
FIG. 17 is a front view of a tablet PC case according to an embodiment of the present invention in a folded state.
Figure 18:
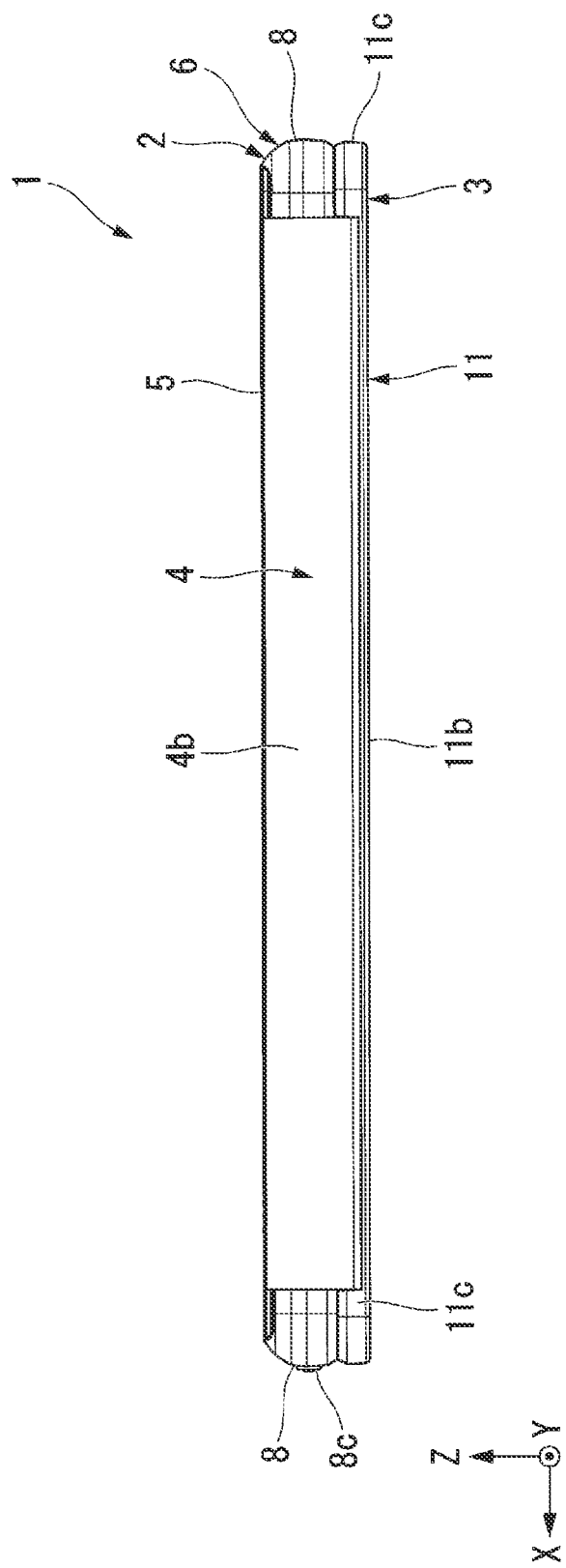
FIG. 18 is a rear view of a tablet PC case according to an embodiment of the present invention in a folded state.
Figure 19:
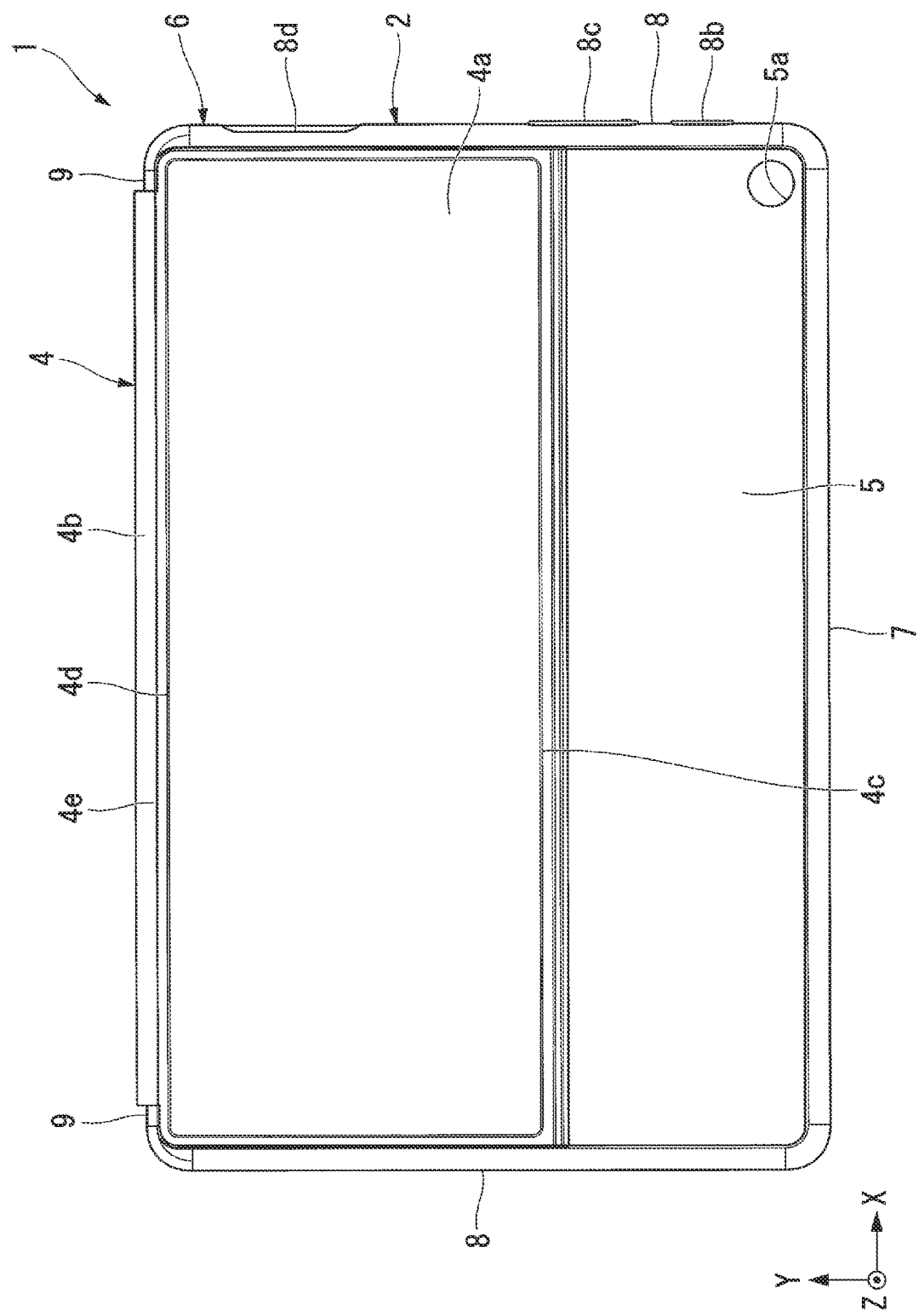
FIG. 19 is a plan view of a tablet PC case according to an embodiment of the present invention in a folded state.
Figure 20:
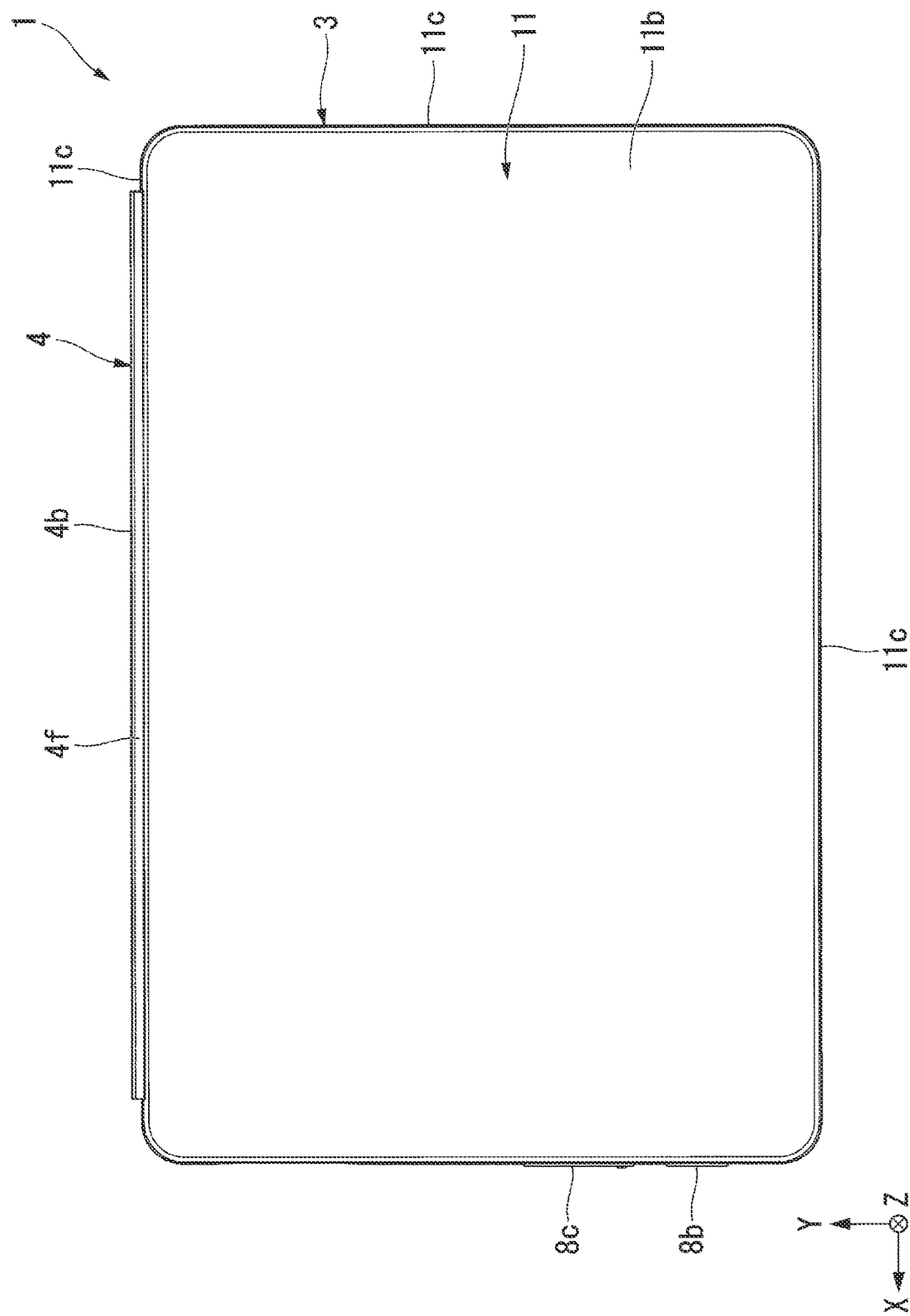
FIG. 20 is a bottom view of a tablet PC case according to an embodiment of the present invention in a folded state.
Figure 21:
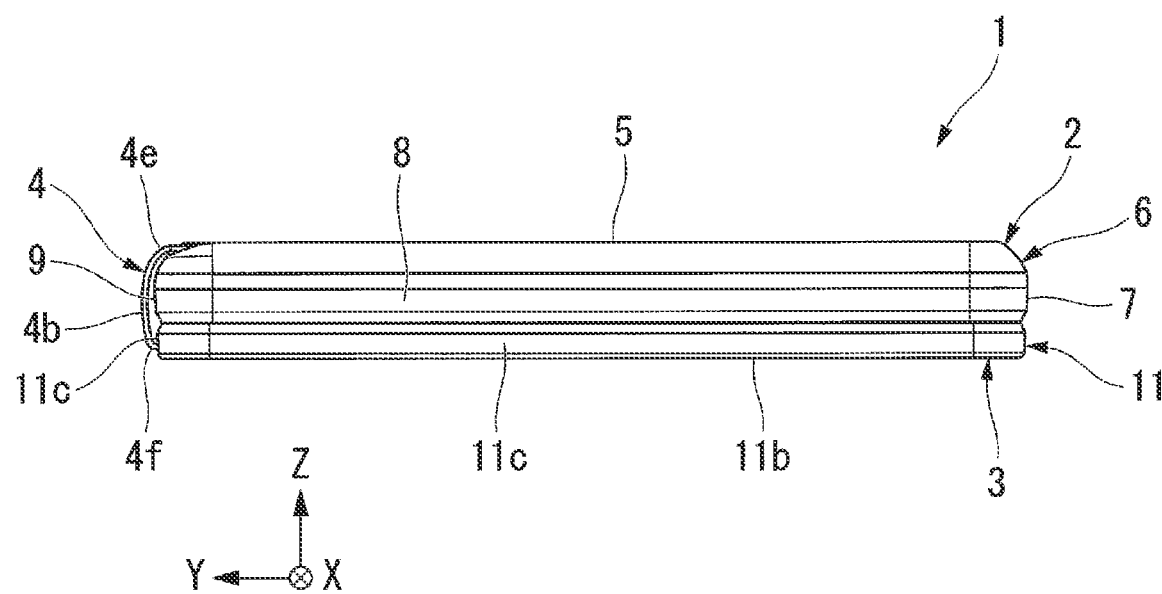
FIG. 21 is a left side view of a tablet PC case according to an embodiment of the present invention in a folded state.
Figure 22:
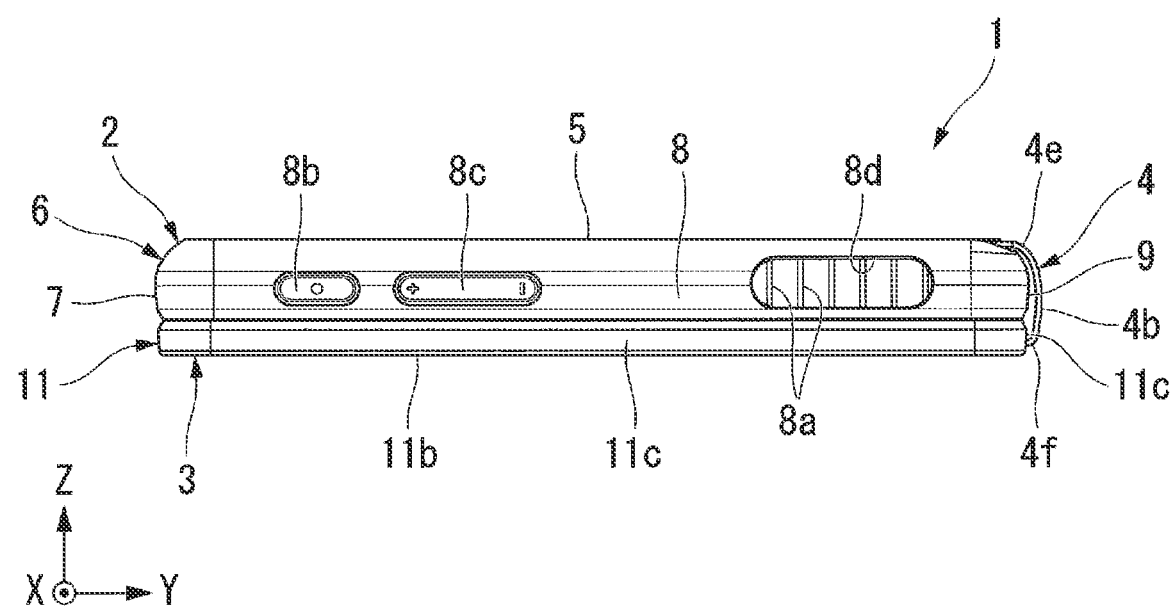
FIG. 22 is a right side view of a tablet PC case according to an embodiment of the present invention in a folded state.

As illustrated in FIG. 19 and FIG. 20, the outer dimension of the chassis 11 in a plan view when viewed in the thickness direction (the X axial dimension and the Y axial dimension) is substantially the same as the outer dimension of the first protective cover 2 in a plan view when viewed in the thickness direction of the rear plate 5. As illustrated in FIG. 17, the length of the chassis 11 in the thickness direction, that is, the thickness dimension (the Z axial dimension), is shorter than the length of the first protective cover 2 in the thickness direction, that is, in the thickness dimension.

As illustrated in FIG. 1, FIG. 2, and FIG. 16, the chassis 11 includes a first cover 11a, a second cover 11b, a lateral surface 11c, and a groove portion 15.

The first cover 11a and the second cover 11b constitute the front outer surface and the rear outer surface, respectively, of the chassis 11, the front outer surface and the rear outer surface being directed in the thickness direction of the chassis 11. That is, the first cover 11a and the second cover 11b are directed opposite from each other in the thickness direction of the chassis 11. Specifically, the first cover 11a constitutes the front outer surface of the chassis 11, while the second cover 11b constitutes the rear outer surface of the chassis 11.

In the folded state illustrated in FIG. 16, the first cover 11a is opposed to the display 51 of the tablet PC 50. That is, the first cover 11a is directed in the thickness direction of the chassis 11, and can be opposed to the display 51.

As illustrated in FIG. 2, the first cover 11a includes a dish portion 11d. The dish portion 11d has an opening where the keys of the keyboard (an input unit) 12 are disposed. That is, in the dish portion 11d, the keyboard 12 is disposed. The dish portion 11d is shaped quadrilateral in a plan view when viewed in the thickness direction, specifically, rectangular. The dish portion 11d has four edges on the circumferential edge of the dish portion 11d. Each edge constitutes a part of the circumferential edge of the dish portion 11d.

The second cover 11b is directed opposite from the first cover 11a in the thickness direction. The second cover 11b is directed opposite from the tablet PC 50 in the folded state and when the tablet PC 50 is in the standing state.

Note that, besides the folded state in the manner described above, that is, a first folded state in which the display 51 of the tablet PC 50 is disposed opposed to the first cover 11a, the electronic apparatus 10 and the tablet PC case 1 in this embodiment can be placed in a second folded state, not particularly illustrated, in which the rear plate 5 of the first protective cover 2 is disposed opposed to the second cover 11b. In the second folded state, the rear plate 5 is in contact with the second cover 11b.

In the first folded state and the second folded state, the lateral surface of the tablet PC 50 is separated from the terminal group 13, so that electrical connection between the tablet PC 50 and the input unit 12 is disconnected. That is, input via the input unit 12, that is, use of the input device, is disabled. In the second folded state, a user can visually check the display 51 of the tablet PC 50 and execute touch operation relative to the display 51, that is, the display 51 is usable.

The lateral surface 11c is a part of the outer surface of the chassis 11, the part being directed in a direction orthogonal to the thickness direction of the chassis 11. A plurality of the lateral surfaces 11c is provided. Specifically, four lateral surfaces 11c are provided in this embodiment. The plurality of lateral surfaces 11c includes a lateral surface 11c directed forward (the −Y side), a lateral surface 11c directed rearward (the +Y side), a lateral surface 11c directed leftward (the −X side), and a lateral surface 11c directed rightward (the +X side). The plurality of lateral surfaces 11c connects the front surface and the rear surface of the chassis 11. That is, the lateral surfaces 11c connect the first cover 11a and the second cover 11b.

As illustrated in FIG. 10 to FIG. 13, the groove portion 15 is recessed from the front surface of the chassis and extends in the extending direction. The groove portion 15 is a groove recessed downward (the −Z side) from the first cover 11a, and extends in the right-left direction (the X axial direction). In this embodiment, the groove portion 15 is disposed over the entire length of the front surface of the chassis 11 in the extending direction. The groove portion 15 is disposed on a rear portion of the first cover 11a. The groove portion 15 is positioned further rearward than the dish portion 11d.

The groove portion 15 includes a first groove 16 and a pair of second grooves 17. The first groove 16 extends in the extending direction, and the one edge 50a of the tablet PC 50 can be retained in the first groove 16 when the tablet PC 50 is in the standing state. The second grooves 17 are disposed on the respective both sides of the first groove 16 in the extending direction, and extend in the extending direction. The pair of retained frame portions 9 is retained in the pair of second grooves 17 when the tablet PC 50 is in the standing state.

The first groove 16 is disposed in the middle portion between the respective both end portions of the groove portion 15 in the extending direction. The first groove 16 has a curved concave base surface 16a extending in the extending direction.

The base surface 16a has a cross section perpendicular to the extending direction, the cross section being shaped like a curved concave line recessed downward. The base surface 16a has a terminal disposition rib 16b projecting from the base surface 16a toward the inside of the first groove 16.

The terminal disposition rib 16b is disposed in the middle portion of the base surface 16a in the extending direction. The terminal disposition rib 16b extends in the extending direction.

The pair of second grooves 17 is disposed on the respective both end portions of the groove portion 15 in the extending direction. The groove width of each second groove 17, that is, the width in the front-rear direction (the Y axial direction), is wider than that of the first groove 16. The groove depth of each second groove 17, that is, the depth in the up-down direction (the Z axial direction), is deeper than that of the first groove 16. The length of the first groove 16 in the extending direction, that is, the length in the right-left direction (the X axial direction), is longer than that of the second groove 17 in the extending direction.

Each second groove 17 includes a groove base surface 17a, a second end face 17b, and a blocking wall 17c. The groove base surface 17a extends in the extending direction and is like a curved concave surface in contact with the outer surface portion 9a of the retained frame portion 9. The second end face 17b is positioned on the inside end portion of the second groove 17 in the extending direction, and is directed outward in the extending direction so as to be opposed to the first end face 9c of the retained frame portion 9 when the tablet PC 50 is in the standing state. The blocking wall 17c is positioned on the outside end portion of the second groove 17 in the extending direction.

The groove base surface 17a has a cross section perpendicular to the extending direction, the cross section being shaped like a curved concave line recessed downward. In a cross sectional view perpendicular to the extending direction, the curvature radius of the groove base surface 17a is larger than that of the base surface 16a.

The second end face 17b is like a flat surface expanding in a direction perpendicular to the extending direction, and is shaped like an arc as a whole when viewed in the extending direction. Of the pair of second grooves 17, the second end face 17b of the second groove 17 positioned on the left side is directed leftward. Meanwhile, of the pair of second grooves 17, the second end face 17b of the second groove 17 positioned on the right side is directed rightward. The respective second end faces 17b of the pair of second grooves 17 are disposed directed opposite from each other at an interval in the extending direction.

Of the pair of second grooves 17, the second end face 17b of the second groove 17 positioned on the left side is opposed to the first end face 9c of the retained frame portion 9 positioned on the left side of the pair of retained frame portions 9 with a space therebetween in the extending direction or in contact with the first end face 9c.

Meanwhile, of the pair of second grooves 17, the second end face 17b of the second groove 17 positioned on the right side is opposed to the first end face 9c of the retained frame portion 9 positioned on the right side of the pair of retained frame portions 9 with a space therebetween in the extending direction or in contact with the first end face 9c.

The blocking wall 17c blocks the second groove 17 from outside in the extending direction. The blocking wall 17c is made using a part of the lateral surface 11c. The surface of the blocking wall 17c directed inward in the extending direction is like a flat surface expanding in a direction perpendicular to the extending direction. The blocking wall 17c is opposed to the outside end portion of the retained frame portion 9 in the extending direction, in the extending direction.

The keyboard 12 is at least partially disposed on the first cover 11a, which constitutes the inner surface (the front surface) of the second protective cover 3, that is, the front surface of the chassis 11.

The keyboard 12 includes a plurality of keys and a back plate (not illustrated). The plurality of keys is a part of the keyboard 12, the part being exposed upward (the +Z side) in the opening of the dish portion 11d. The plurality of keys is aligned in the respective right-left and front-rear directions. The back plate is a part of the keyboard 12, the part being disposed inside the chassis 11 and supporting the plurality of keys.

The terminal group 13 is disposed in the first groove 16. The terminal group 13 is exposed in the first groove 16. The terminal group 13 projects from the base surface 16a into the inside of the first groove 16. The terminal group 13 is disposed in the terminal disposition rib 16b. The terminal group 13 includes a plurality of terminals 13a disposed aligned in the extending direction. The terminal group 13 includes a terminal (a first terminal) 13a to feed power from the tablet PC 50 to the keyboard 12, and a terminal (a second terminal) 13a to output an input signal from the keyboard 12 to the tablet PC 50.

The terminal 13a projects from the base surface 16a of the first groove 16 to the inside of the first groove 16, and includes a pin portion whose amount of projection is changeable and an urging portion (not illustrated) to urge the pin portion in a direction in which the pin portion projects from the base surface 16a. That is, the terminal group 13 includes the pin portion and the urging portion. The terminal 13a retractably projects from the base surface 16a while being urged upward. The terminal 13a in this embodiment is a so-called pogo pin.

Figure 13:
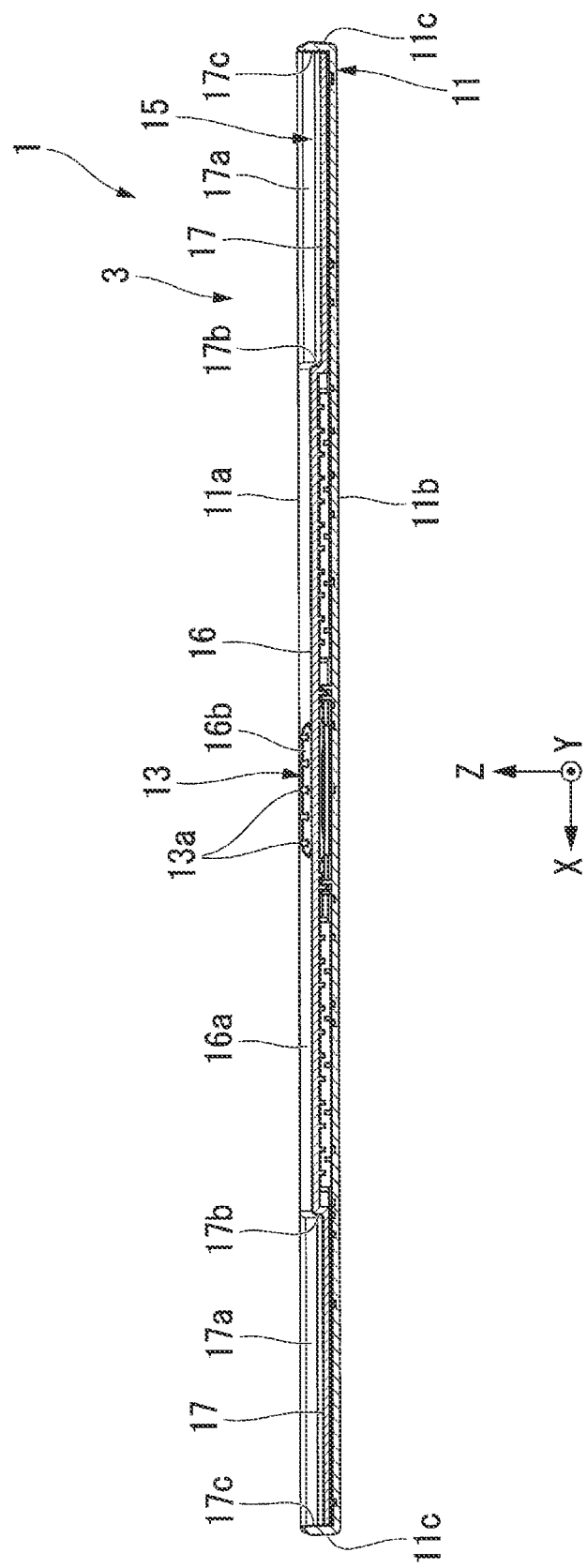
FIG. 13 is a cross sectional view of a cross section along line XIII-XIII in FIG. 12 with a magnet portion not illustrated.
Figure 14:
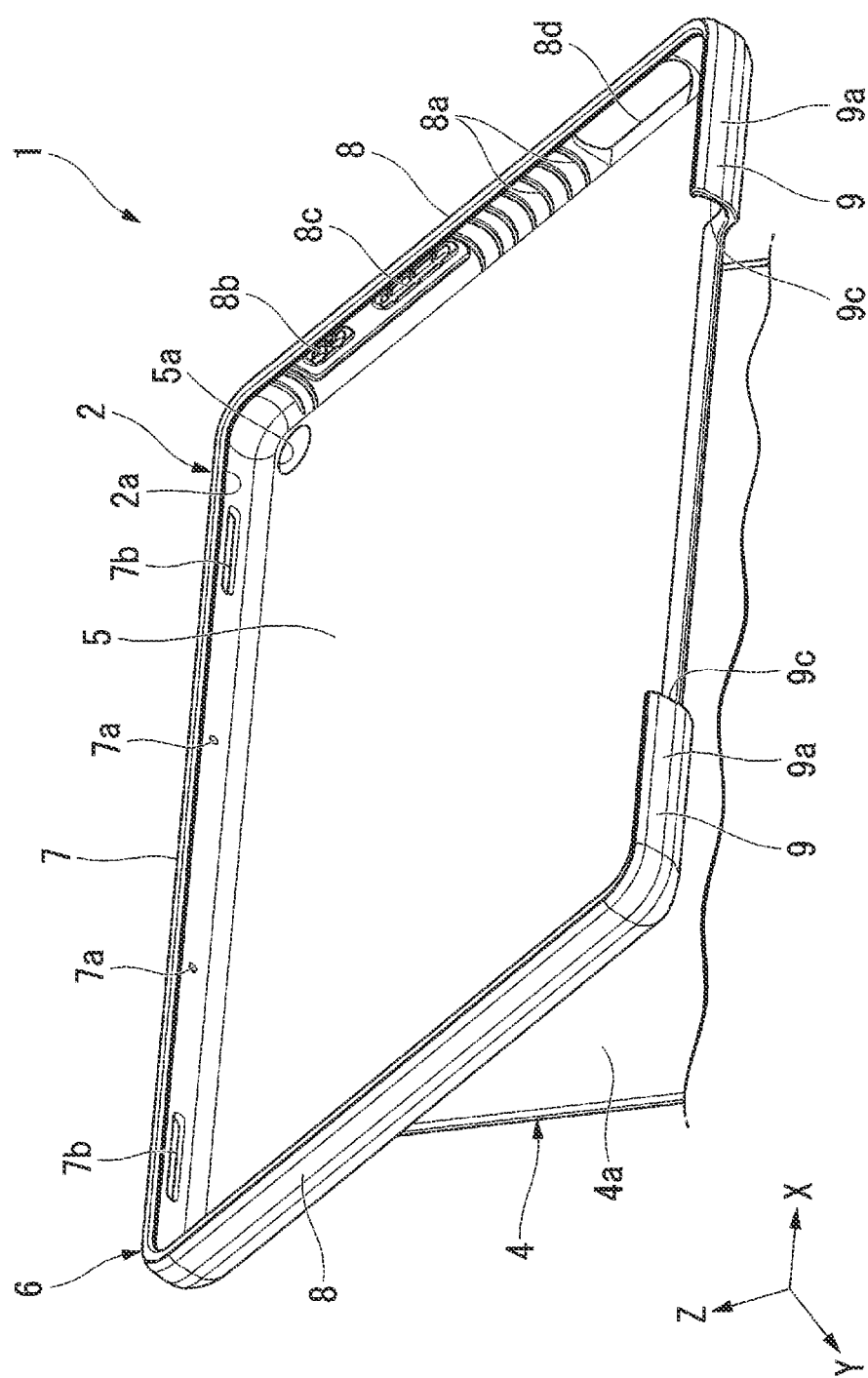
FIG. 14 is a partial perspective view of a major portion of a tablet PC case according to an embodiment of the present invention.

As illustrated in FIG. 12, the magnet portion 14 is disposed on the backside of the first groove 16 inside the chassis 11. That is, the magnet portion 14 is positioned inside the first groove 16 in the chassis 11. In a plan view of the chassis 11 illustrated in FIG. 12 when viewed in the thickness direction, the magnet portion 14 is disposed overlapping the first groove 16. In FIG. 13, the magnet portion 14 is not illustrated. The magnet portion 14 extends in the extending direction. With the tablet PC 50 in the standing state, the magnet portion 14 is disposed close to the one edge 50a of the tablet PC 50. The magnet portion 14 attracts the tablet magnet portion of the tablet PC 50 by means of a magnetic force to thereby attract the lateral surface of the tablet PC 50.

As illustrated in FIG. 3, the connection unit 4 connects the first protective cover 2 and the second protective cover 3 in a relatively movable manner. The connection unit 4 can hold the first protective cover 2 and the second protective cover 3 in such a manner that the first protective cover 2 stands on the second protective cover 3, or in the standing state.

The connection unit 4 includes a support plate 4a connected to the first protective cover 2 and capable of supporting the first protective cover 2, and a deformable flexible sheet 4b connecting the support plate 4a and the second protective cover 3.

With the tablet PC 50 in the standing state, the support plate 4a supports the tablet PC 50, housed in the first protective cover 2 and the first protective cover 2, from the rear side of the tablet PC 50. The support plate 4a is shaped like a plate. That is, the support plate 4a is shaped like a quadrilateral plate, specifically, a rectangular plate. Of the four edges of the outer edge portion of the support plate 4a, a pair of longer edges 4c, 4d extends in the right-left direction. Of the pair of longer edges 4c, 4d of the support plate 4a, one longer edge 4c is connected to the rear plate 5 of the first protective cover 2. The longer edge 4c of the support plate 4a is connected to the middle portion of the rear plate 5, the middle portion being positioned between the respective both end portions in the direction in which the side frame portion 8 extends. Of the pair of longer edges 4c, 4d, a longer edge different from the longer edge 4c, namely, the longer edge 4d, is connected to the flexible sheet 4b.

When the tablet PC 50 is in the standing state, the longer edge 4c is positioned on the upper end portion of the support plate 4a, and the longer edge 4d is positioned on the lower end portion of the support plate 4a. As illustrated in FIG. 15, in the folding state, one plate surface of a pair of plate surfaces of the support plate 4a is in contact with the rear plate 5. In the folded state, the support plate 4a covers at least a part of the rear plate 5.

As illustrated in FIG. 3 and FIG. 15, the flexible sheet 4b is a deformable sheet. The flexible sheet 4b is a quadrilateral sheet, specifically, a rectangular sheet. Of the four edges of the outer edge portion of the flexible sheet 4b, a pair of longer edges 4e, 4f extends in the right-left direction. Of the pair of longer edges 4e, 4f of the flexible sheet 4b, one longer edge 4e is connected to the longer edge 4d of the support plate 4a. Meanwhile, of the pair of longer edges 4e, 4f, a longer edge different from the longer edge 4e, namely, the longer edge 4f, is connected to the lateral surface 11c directed rearward (the +Y side) of the chassis 11. The length (width) of the flexible sheet 4b in the right-left direction is shorter than that of the support plate 4a in the right-left direction.

As illustrated in FIG. 15, in the folded state, the flexible sheet 4b deforms like the spine portion of a book, and covers the one edge 50a of the outer circumferential portion of the tablet PC 50, that is, the lateral surface of the tablet PC 50, and one edge of the outer circumferential portion of the chassis 11, that is, the lateral surface 11c directed rearward.

The above-described tablet PC case 1 and the electronic apparatus 10 according to the above-described embodiment can prevent damage to the tablet PC 50, for example, even when the electronic apparatus 10 is used at school or the like for an educational purpose as the tablet PC 50 is housed in the first protective cover 2 and thereby protected against an impact or the like. In addition, in the folded state, the tablet PC 50 is protected against an impact or the like also with the second protective cover 3.

In the use state of the input device, or in a state in which the tablet PC 50 stands on the chassis 11 of the second protective cover 3, the one edge 50a of the outer circumferential portion of the tablet PC 50, that is, the lateral surface of the tablet PC 50, is retained directly in the first groove 16 of the groove portion 15 of the chassis 11, and the pair of retained frame portions 9 of the first protective cover 2 is retained in the pair of second grooves 17 of the groove portion 15. Thus, compared with a case, for example, in which only the frame body 6 of the first protective cover 2 is retained in the groove portion 15, and the outer circumferential portion of the tablet PC 50 is not retained in the groove portion 15, different from this embodiment, this embodiment can stabilize the retaining state between the tablet PC 50 and the groove portion 15 as the outer circumferential portion of the tablet PC 50 is retained directly in the groove portion 15, and thereby stabilize the standing posture of the tablet PC 50. Specifically, according to this embodiment, displacement of the tablet PC 50 and the groove portion 15 in the front-rear direction, in particular, can be prevented.

Also, as the respective first end faces 9c of the pair of retained frame portions 9 are disposed opposed to the respective second end faces 17b of the pair of second grooves 17 in the extending direction of the one edge 50a of the tablet PC 50, deficiency such as sliding movement of the tablet PC 50 in the standing state in the extending direction in the groove portion 15 is prevented. Specifically, according to this embodiment, displacement of the tablet PC 50 and the groove portion 15 in the right-left direction in particular can be prevented.

Also, as the magnet portion 14 provided on the backside of the first groove 16 in the chassis 11 attracts the tablet PC 50 by means of a magnetic force without intervention of the frame body 6 of the first protective cover 2, deficiency such as removal of the tablet PC 50 from the groove portion 15 is prevented. Specifically, according to this embodiment, separation of the tablet PC 50 and the groove portion 15 in the up-down direction in particular can be prevented.

That is, this embodiment prevents relative movements of the tablet PC 50 and the groove portion 15 in the front-rear direction (the Y axial direction), the right-left direction (the X axial direction), and the up-down direction (the Z axial direction), respectively.

Also, the curved convex outer surface portion 9a of the retained frame portion 9 is in contact with the curved concave groove base surface 17a of the second groove 17. That is, the curved convex surface of the retained frame portion 9 is in slidable contact with the curved concave surface of the second groove 17. This allows change in the angle at which the tablet PC 50 stands on the chassis 11, or the inclination angle of the display 51 of the tablet PC 50, for example, by changing the inclination angle of the support plate 4a to thereby slide (rotate) the outer surface portion 9a on the groove base surface 17a.

Also, as the one edge 50a of the outer circumferential portion of the tablet PC 50 is retained in the first groove 16, placement of the tablet PC 50 in the groove portion 15 so as to be in the standing posture can readily have the terminal group 13 of the first groove 16 in contact with the tablet terminal group on the one edge 50a of the tablet PC 50. This enables direct and stable connection between the terminal group 13 of the second protective cover 3 and the tablet terminal group while keeping a small projecting length of the terminal group 13 of the second protective cover 3. That is, a wired electrical connection can be readily established between the tablet PC 50 and the input unit (the input device) 12 while keeping a good appearance. As the tablet PC 50 is connected to the input unit 12 via a wire, rather than wireless, an input operation relative to the keyboard (the input unit) 12 is not transmitted to the tablet PC 50 in a mode of the electronic apparatus 10 in which the input device is not used, such as, when the electronic apparatus 10 is folded, for example. This can prevent unintended erroneous input or the like.

Specifically, in the case where the tablet PC 50 is wirelessly electrically connected to the input unit 12, for example, via Bluetooth (registered trademark), different from this embodiment, there is a possibility that the connection be crossed among users in use of the electronic apparatus 10 for an educational purpose or the like in which a plurality of users is present in the same area. Moreover, various sensors or the like to determine whether the mode of the electronic apparatus 10 is in a state with an input device used or a state with an input device not used are necessary in order to prevent unintended erroneous input, which makes the structure completed. Meanwhile, according to this embodiment, it is possible to establish a stable electrical connection between the tablet PC 50 and an input device with a simple structure.

Also, in this embodiment, as the groove width of the second groove 17 is wider than that of the first groove 16, it is possible to ensure that the retained frame portion 9 has a certain amount of thickness to prevent damage to the tablet PC 50 due to an impact or the like, and also to have the retained frame portion 9 stably retained in the second groove 17.

Also, in this embodiment, as the groove depth of the second groove 17 is deeper than that of the first groove 16, it is possible to ensure that the retained frame portion 9 has a certain amount of thickness to prevent damage to the tablet PC 50 due to an impact or the like, and also to have the retained frame portion 9 stably retained in the second groove 17.

Also, in this embodiment, as the curvature radius of the groove base surface 17a of the second groove 17 is larger than that of the base surface 16a of the first groove 16 in a cross sectional view perpendicular to the extending direction, it is easy to make the groove width and depth of the second groove 17 wider and deeper than those of the first groove 16. Thus, it is possible to ensure that the retained frame portion 9 has a certain amount of thickness to prevent damage to the tablet PC 50 due to an impact or the like, and also to have the retained frame portion 9 stably retained in the second groove 17.

Also, in this embodiment, as the blocking wall 17c blocks the outside end portion of the second groove 17 in the extending direction, it is possible to have the groove portion 15 not exposed on the outer surface (the lateral surface 11c) in a side view when viewed in the extending direction of the chassis 11 so that a good appearance of the chassis 11 can be maintained, while the groove portion 15 is provided on the front surface of the chassis 11. Also, movement of the retained frame portion 9 retained in the second groove 17 in the extending direction can be prevented also with the blocking wall 17c.

Also, in this embodiment, as the length of the first groove 16 in the extending direction is longer than that of the second groove 17 in the extending direction, the retaining state between the first groove 16 and the one edge 50a of the tablet PC 50 is further stabilized. Also, this increases the degree of freedom in laying out the terminal group 13 to be disposed in the first groove 16, which makes it possible to readily accommodate various tablets PC 50.

Also, in this embodiment, as the groove portion 15 is disposed over the entire length of the front surface of the chassis 11 in the extending direction, a large retaining area can be ensured between the one edge 50a of the outer circumferential portion of the tablet PC 50 and the pair of retained frame portions 9 and the groove portion 15. This can further stabilize the standing posture of the tablet PC 50.

Also, in this embodiment, as the terminals 13a included in the terminal group 13 of the second protective cover 3 are so-called pogo pins that retractably project from the base surface 16a of the first groove 16, a preferable state of contact can be maintained between the terminal group 13 of the second protective cover 3 and the tablet terminal group, for example, even when the inclination angle of the display 51 of the tablet PC 50 is adjusted.

Also, in this embodiment, as the plurality of terminals 13a included in the terminal group 13 is disposed aligned in the extending direction in the first groove 16, it is possible to readily accommodate the specifications of various tablets PC 50 and input devices. Also, compared with a case in which, for example, a plurality of terminals 13a is aligned in the groove width direction in the first groove 16, different from this embodiment, according to this embodiment, the terminal group 13 can be readily disposed, and deficiency such as failed connection of the terminal group 13 due to an inappropriate inclination angle of the display 51 of the tablet PC 50 is unlikely caused.

In this embodiment, as the connection unit 4 includes the support plate 4a supporting the tablet PC 50 and the first protective cover 2 and the flexible sheet 4b connecting the support plate 4a and the second protective cover 3, it is possible to protect the surface directed opposite from the display 51 of the tablet PC 50 in the folded state, that is, the rear surface, not only with the rear plate 5 of the first protective cover 2 but also with the support plate 4a. In the folded state, the flexible sheet 4b deforms like the spine portion of a book whereby the one edge 50a of the outer circumferential portion of the tablet PC 50 and one edge (the lateral surface 11c) of the outer circumferential portion of the chassis 11 can be protected.

Also, in this embodiment, the terminals 13 include a terminal 13a to feed power from the tablet PC 50 to the keyboard 12 and a terminal 13a to output an input signal from the keyboard 12 to the tablet PC 50. That is, the terminals 13a having respective functions are gathered in the terminal group 13, and any terminal group other than the terminal group 13 is unnecessary to be provided. This enables ready establishment of a stable electrical connection between the tablet PC 50 and the input unit 12 in this embodiment.

Note that the present invention is not limited to the above-described embodiment, and the structures can be modified or the like within a range not departing from the gist of the present invention, as to be described below, for example.

In the above-described embodiment, a case in which the input unit 12 of the second protective cover 3 is the keyboard 12 is described as a non-exclusive example. The input unit 12 may be a highly accurate touch pad (precision touch pad, or PTP) or the like.

Figure 23:
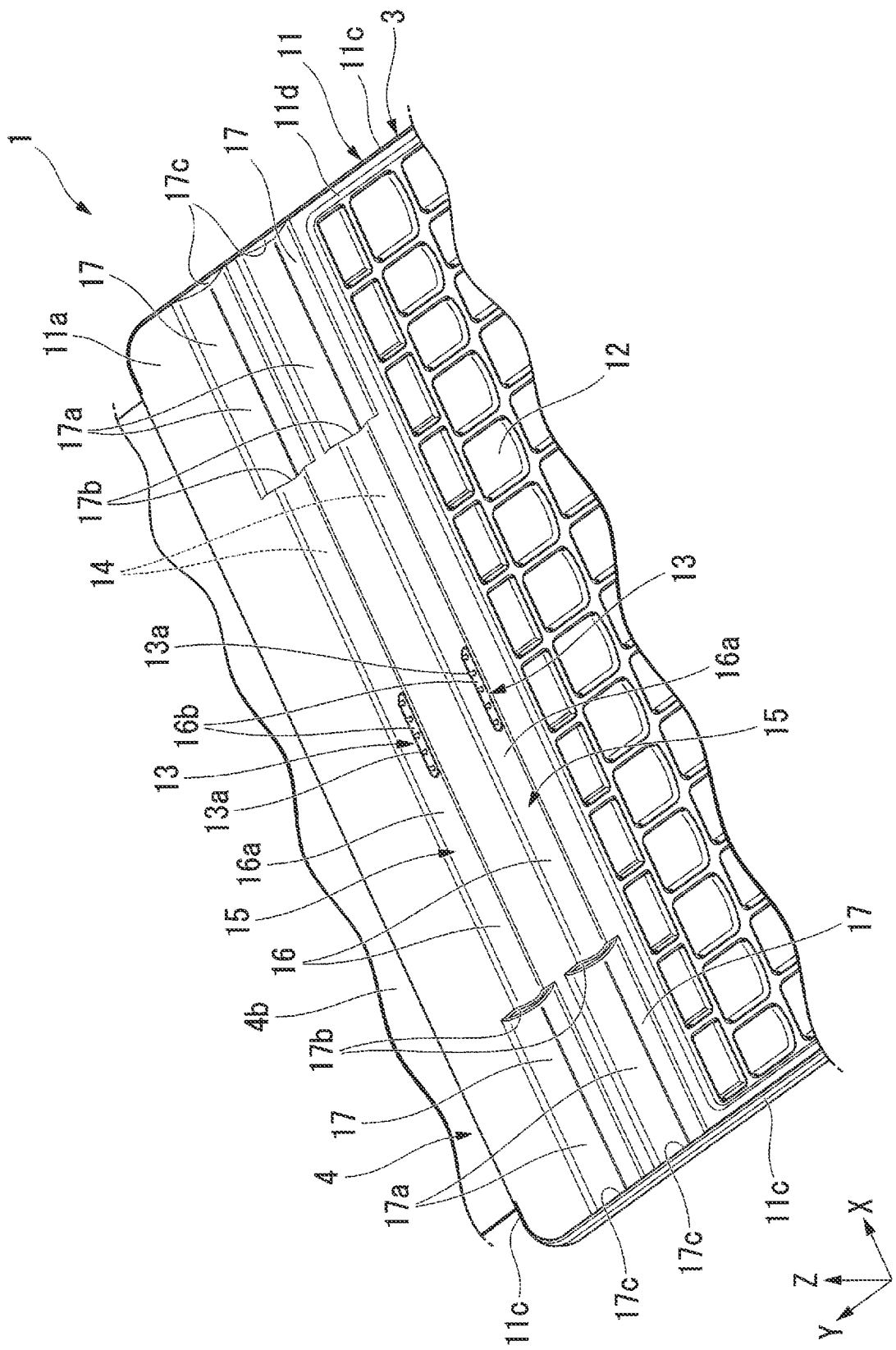
FIG. 23 is a partial perspective view of a modified example of a tablet PC case according to an embodiment of the present invention.

In the above-described embodiment, a case in which the chassis 11 has a single groove portion 15 on the front surface of the chassis 11, that is, the first cover 11a, is described as a non-exclusive example. Like the modified example illustrated in FIG. 23, the chassis 11 may have a plurality of, for example, two, three, or four, groove portions 15 on the front surface of the chassis 11. The plurality of groove portions 15 is disposed aligned in the front-rear direction (the Y axial direction).

In this case, the inclination angle of the display 51 can be arbitrarily selected from a plurality of angles when the tablet PC 50 is in the standing state.

Other than the above, the respective structures (structural components) described in the above-described embodiment, modified examples, and notes, or the like, can be combined within a range not departing from the gist of the present invention, and addition, omission, replacement, and any other modifications of a structure is possible. The present invention is not restricted by the above-described embodiment or the like, but restricted only by the scope of the claims.

The invention claimed is:

1. A tablet PC case, comprising:
a first protective cover having an opening in which a display surface of a tablet PC is exposed, the first protective cover configured to house the tablet PC therein;
a second protective cover configured to cover the opening of the first protective cover and thereby open or close the opening; and
a connection unit connecting the first protective cover and the second protective cover in a relatively movable manner, the connection unit configured to hold the first protective cover in a standing state in which the first protective cover stands on the second protective cover,
wherein
the first protective cover includes a frame body configured to cover an outer circumferential portion of the tablet PC, the frame body also configured to hold the tablet PC,
the frame body includes a pair of retained frame portions configured to extend along one edge of the outer circumferential portion of the tablet PC, the one edge being opposed to the second protective cover in the standing state, the pair of retained frame portions being disposed at an interval in an extending direction in which the one edge extends,
the retained frame portions each include:
an outer surface portion having a curved convex surface, extending in the extending direction, and
a first end face positioned on an inside end portion of the retained frame portion in the extending direction, the first end face being directed inward in the extending direction, the second protective cover includes:
  a chassis having a plate external shape,
  the chassis configured to hold an input unit,
  an inner surface of the second protective cover configured to support the input unit,
  a terminal group exposed on the inner surface of the second protective cover in a position closer to the connection unit than the input unit, the terminal group being electrically connectable to a lateral surface of the tablet PC in the standing state, and
  a magnet portion inside the chassis, the magnet portion configured to attract the tablet PC by means of a magnetic force when the terminal group is connected to the tablet PC,
the chassis has a groove portion recessed from a front surface of the chassis and extending in the extending direction,
the groove portion includes:
  a first groove extending in the extending direction so that the one edge of the tablet PC in the standing state is able to be retained in the first groove, and
  a pair of second grooves disposed on respective both sides of the first groove in the extending direction and extending in the extending direction so that the pair of retained frame portions is retained in the standing state in the pair of second grooves,
each of the second grooves include:
  a groove base surface having a curved concave surface, the groove base surface extending in the extending direction, the groove base surface being in contact with the outer surface portion, and
  a second end face positioned on an inside end portion of the second groove in the extending direction, the second end face being directed outward in the extending direction, the second end face being opposed to the first end face in the standing state, and
the terminal group is in the first groove.

2. The tablet PC case according to claim 1, wherein
the second groove has a groove width that is wider than a groove width of the first groove, and
the second groove has a groove depth that is deeper than a groove depth of the first groove.

3. The table PC case according to claim 1, wherein
the first groove includes a base surface having a curved concave surface, the base surface extending in the extending direction, and
the groove base surface has a curvature radius that is larger than a curvature radius of the base surface in a cross sectional view perpendicular to the extending direction.

4. The tablet PC case according to claim 1, wherein
the second groove includes a blocking wall positioned on an outside end portion of the second groove in the extending direction, and
the blocking wall blocks the second groove from exposed to outside of the tablet PC in the extending direction.

5. The tablet PC case according to claim 1, wherein the first groove has a length in the extending direction, the length being longer than a length of the second groove in the extending direction.

6. The tablet PC case according to claim 1, wherein the groove portion is disposed over an entire length of the front surface of the chassis in the extending direction.

7. The tablet PC case according to claim 1, wherein
the terminal group includes
  a pin portion projecting from the base surface of the first groove into an inside the first groove, wherein an amount of projection of the pin portion is changeable, and
  an urging portion configured to urge the pin portion in a direction in which the pin portion projects from the base surface.

8. The tablet PC case according to claim 1, wherein the terminal group includes a plurality of terminals aligned in the extending direction.

9. The tablet PC case according to claim 1, wherein
the connection unit includes:
  a support plate connected to the first protective cover, the support plate configured to support the first protective cover, and
  a deformable flexible sheet connecting the support plate and the second protective cover.

10. The tablet PC case according to claim 1, wherein
the input unit is a keyboard, and
the terminal group includes a terminal configured to feed power from the tablet PC to the keyboard and a terminal configured to output an input signal from the keyboard to the tablet PC.

11. An electronic apparatus, comprising:
the tablet PC case according to claim 1, and
the tablet PC is housed in the first protective cover.

* * * * *